(12) United States Patent
Ando et al.

(10) Patent No.: US 8,522,229 B2
(45) Date of Patent: Aug. 27, 2013

(54) IMAGE FORMING APPARATUS, INFORMATION PROCESSING METHOD, AND RECORDING MEDIUM FOR DIRECTLY UPDATE A MODULE OF THE IMAGE FORMING APPARATUS WITHOUT CHANGING OTHER MODULES

(75) Inventors: Mitsuo Ando, Fukuoka (JP); Kunihiro Akiyoshi, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 1248 days.

(21) Appl. No.: 11/509,601

(22) Filed: Aug. 25, 2006

(65) Prior Publication Data

US 2007/0047017 A1    Mar. 1, 2007

(30) Foreign Application Priority Data

Aug. 26, 2005  (JP) ................................ 2005-246226
Aug. 21, 2006  (JP) ................................ 2006-224521

(51) Int. Cl.
*G06F 9/44*    (2006.01)
*G06F 9/445*   (2006.01)

(52) U.S. Cl.
USPC ........... 717/168; 717/169; 717/170; 717/171; 717/173; 717/174; 717/175; 717/176; 717/178

(58) Field of Classification Search
USPC ..................... 717/168, 169, 170; 358/1.13
See application file for complete search history.

(56) References Cited

U.S. PATENT DOCUMENTS

| | | | | |
|---|---|---|---|---|
| 5,649,112 A * | 7/1997 | Yeager et al. | ................. | 709/220 |
| 6,158,001 A * | 12/2000 | Lee et al. | ........................... | 713/1 |
| 6,202,207 B1 * | 3/2001 | Donohue | ...................... | 717/173 |
| 6,286,138 B1 * | 9/2001 | Purcell | .......................... | 717/143 |
| 6,289,510 B1 * | 9/2001 | Nakajima | ..................... | 717/170 |
| 6,360,363 B1 * | 3/2002 | Moser et al. | .................. | 717/170 |
| 6,452,695 B1 * | 9/2002 | Casey et al. | ..................... | 358/1.6 |
| 6,983,449 B2 * | 1/2006 | Newman | ....................... | 717/121 |
| 7,509,249 B2 * | 3/2009 | Britt et al. | ....................... | 703/27 |
| 7,844,963 B2 * | 11/2010 | Pitzel et al. | .................... | 717/171 |

(Continued)

FOREIGN PATENT DOCUMENTS

| | | |
|---|---|---|
| JP | 8-194612 | 7/1996 |
| JP | 9-167094 | 6/1997 |
| JP | 11-259284 | 9/1999 |
| JP | 2002-84383 | 3/2002 |

OTHER PUBLICATIONS

Ganger et al, "Soft Updates: A Solution to the Metadata Update Problem in File Systems", ACM Transactions on Computer Systems, vol. 18, No. 2, May 2000, pp. 127-153.*

(Continued)

*Primary Examiner* — Emerson Puente
*Assistant Examiner* — Charles Swift
(74) *Attorney, Agent, or Firm* — Oblon, Spivak, McClelland, Maier & Neustadt, L.L.P.

(57) ABSTRACT

An image forming apparatus executing a program configured by connecting multiple modules operating exclusively with respect to each other is disclosed that includes an input part configured to receive an input of updating information of the program; a determination part configured to determine whether an operating state of the program corresponds to a time for updating specified in the updating information; and a change part configured to change the relationship of connection of the modules in accordance with the updating information if the determination part determines that the operating state of the program corresponds to the time for updating.

16 Claims, 22 Drawing Sheets

(56) References Cited

U.S. PATENT DOCUMENTS

| | | | |
|---|---|---|---|
| 8,266,590 B2* | 9/2012 | Smith | 717/120 |
| 2002/0143924 A1* | 10/2002 | Iga | 709/223 |
| 2002/0188933 A1* | 12/2002 | Lee et al. | 717/168 |
| 2003/0005426 A1* | 1/2003 | Scholtens et al. | 717/169 |
| 2003/0044185 A1* | 3/2003 | Kawaura | 399/8 |
| 2003/0051069 A1* | 3/2003 | Iida | 709/321 |
| 2003/0055890 A1* | 3/2003 | Senda | 709/203 |
| 2003/0086111 A1 | 5/2003 | Akiyoshi | |
| 2003/0218765 A1* | 11/2003 | Ohishi et al. | 358/1.13 |
| 2004/0003371 A1* | 1/2004 | Coulthard et al. | 717/101 |
| 2004/0021890 A1 | 2/2004 | Hirai et al. | |
| 2004/0057067 A1* | 3/2004 | Ohishi et al. | 358/1.13 |
| 2004/0075857 A1 | 4/2004 | Akiyoshi et al. | |
| 2004/0109188 A1 | 6/2004 | Akiyoshi et al. | |
| 2004/0196471 A1 | 10/2004 | Hirai et al. | |
| 2004/0218208 A1* | 11/2004 | Akiyoshi et al. | 358/1.15 |
| 2004/0249934 A1* | 12/2004 | Anderson et al. | 709/224 |
| 2004/0255263 A1* | 12/2004 | Ando | 717/100 |
| 2005/0068558 A1* | 3/2005 | Wang et al. | 358/1.13 |
| 2005/0071648 A1 | 3/2005 | Shimizu et al. | |
| 2005/0071660 A1 | 3/2005 | Shimizu et al. | |
| 2005/0097543 A1* | 5/2005 | Hirayama | 717/168 |
| 2005/0226641 A1 | 10/2005 | Ando et al. | |
| 2006/0070087 A1 | 3/2006 | Ando et al. | |

OTHER PUBLICATIONS

Wang et al, "An Architecture for Embedded Software Integration Using Reusable Components", ACM, Nov. 2000, pp. 110-118.*

Japanese Office Action issued Jan. 8, 2013, in Japan Patent Application No. 2011-129761.

* cited by examiner

FIG.15

```
                                                                          ┌900
121:<StateMachine xmi.id="004" name="StateMachine FaxTx1" version="0" unSolvedFlag="false">
122:  <StateMachine.top>
123:    <CompositeState xmi.id="016" name="" version="0"
                              unSolvedFlag="false" isConcurrent="true" isRegion="true">
124:      <CompositeState.subvertex>
125:        <CompositeState xmi.id="017" name="FaxTx1" version="0"
                              unSolvedFlag="false" isConcurrent="true" isRegion="true">
126:          <StateVertex.container>
127:            <CompositeState xmi.idref="016"/>
128:          </StateVertex.container>
129:          <CompositeState.subvertex>
130:            <Pseudostate xmi.id="018" name="Init" version="0"
                              unSolvedFlag="false" kind="initial">                      910
131:              <StateVertex.container>
132:                <CompositeState xmi.idref="017"/>
133:              </StateVertex.container>
134:              <StateVertex.outgoing>
135:                <Transition xmi.idref="018"/>  ---911
136:              </StateVertex.outgoing>
137:            </Pseudostate>
138:            <CompositeState xmi.id="019" name="Send" version="0"
                              unSolvedFlag="false" isConcurrent="true" isRegion="true">  920
139:              <StateVertex.container>
140:                <CompositeState xmi.idref="017"/>
141:              </StateVertex.container>
142:              <StateVertex.outgoing>
143:                <Transition xmi.idref="020"/>  ---921
144:              </StateVertex.outgoing>
145:              <StateVertex.incoming>
146:                <Transition xmi.idref="023"/>  ---922
147:              </StateVertex.incoming>
148:            </CompositeState>
149:            <CompositeState xmi.id="022" name="Idle" version="0"
                              unSolvedFlag="false" isConcurrent="true" isRegion="true">  930
150:              <StateVertex.container>
151:                <CompositeState xmi.idref="017"/>
152:              </StateVertex.container>
153:              <StateVertex.outgoing>
154:                <Transition xmi.idref="023"/>  ---930
155:              </StateVertex.outgoing>
156:              <StateVertex.incoming>
157:                <Transition xmi.idref="018"/>  ---931
158:              </StateVertex.incoming>
159:            </CompositeState>
160:            <FinalState xmi.id="024" name="end" version="0" unSolvedFlag="false">   940
161:              <StateVertex.container>
162:                <CompositeState xmi.idref="017"/>
163:              </StateVertex.container>
164:              <StateVertex.incoming>
165:                <Transition xmi.idref="020"/>  ---941
```

FIG.16

```
166:              </StateVertex.incoming>
167:            </FinalState>
182:          </CompositeState.subvertex>
183:        </CompositeState>
184:      </CompositeState.subvertex>
185:    </CompositeState>
186: </StateMachine.top>
187: <StateMachine.context>
188:    <ModelElement xmi.idref="001"/>
189: </StateMachine.context>
190: <StateMachine.transitions>
191:    <Transition xmi.id="023" name="Transmission Start" version="0" unSolvedFlag="false">                950
192:      <Transition.trigger>
193:        <Event xmi.id="027" name="Transmission Start" version="0" unSolvedFlag="false"></Event>
194:      </Transition.trigger>
195:      <Transition.source>
196:        <StateVertex xmi.idref="022"/>            951
197:      </Transition.source>
198:      <Transition.target>
199:        <StateVertex xmi.idref="019"/>            952
200:      </Transition.target>
201:      <Transition.stateMachine>
202:        <StateMachine xmi.idref="004"/>
203:      </Transition.stateMachine>
204:    </Transition>
205:    <Transition xmi.id="020" name="Transmission End" version="0" unSolvedFlag="false">                 960
206:      <Transition.trigger>
207:        <Event xmi.id="028" name="Transmission End" version="0" unSolvedFlag="false"></Event>
208:      </Transition.trigger>
209:      <Transition.source>
210:        <StateVertex xmi.idref="019"/>            961
211:      </Transition.source>
212:      <Transition.target>
213:        <StateVertex xmi.idref="024"/>            952
214:      </Transition.target>
215:      <Transition.stateMachine>
216:        <StateMachine xmi.idref="004"/>
217:      </Transition.stateMachine>
218:    </Transition>
219:    <Transition xmi.id="018" name="" version="0" unSolvedFlag="false">                                  970
220:      <Transition.source>
221:        <StateVertex xmi.idref="018"/>            971
222:      </Transition.source>
223:      <Transition.target>
224:        <StateVertex xmi.idref="022"/>            972
225:      </Transition.target>
226:      <Transition.stateMachine>
227:        <StateMachine xmi.idref="004"/>
228:      </Transition.stateMachine>
244: </StateMachine.transitions>
```

FIG.19

```
 1: <aspectSM>
 2:   <aspect XML.StateMachine="StateMacbine_FaxTx1" xmi.idref="004">
 3:     <pointcut.CompositeState xmi.idref="017" timing="Idle">
 4:       <advice.CompositeState type="insert">
 5:         <CompositeState xmi.id="025" name="Transform" version="0"
                unSolvedFlag="false" isConcurrent="true" isRegion="true">
 6:           <StateVertex.container>
 7:             <CompositeState xmi.idref="017"/>
 8:           </StateVertex.container>
 9:           <StateVertex.outgoing>
10:             <Transition xmi.idref="021"/>
11:           </StateVertex.outgoing>
12:           <StateVertex.incoming>
13:             <Transition xmi.idref="023"/>
14:           </StateVertex.incoming>
15:           <State.entry>
16:             <Action xmi.id="026" name="pdf2tiff" version="0" unSolvedFlag="false"
                  isAsynchronous="false" actionType="5"></Action>
17:           </State.entry>
18:         </CompositeState>
19:       </advice>
20:     </pointcut>
21:     <pointcut.Transition xmi.idref="023" timing="Idle">
22:       <advice.Transition.target type="modify">
23:         <StateVertex xmi.idref="025"/>
24:       </advice>
25:       <advice.Transition type="insert">
26:         </Transition>
27:         <Transition xmi.id="021" name="Conversion End" version="0" unSolvedFlag="false">
28:           <Transition.trigger>
29:             <Event xmi.id="029" name="Conversion End" version="0"
                  unSolvedFlag="false"></Event>
30:           </Transition.trigger>
31:           <Transition.source>
32:             <StateVertex xmi.idref="025"/>
33:           </Transition.source>
34:           <Transition.target>
35:             <StateVertex xmi.idref="019"/>
36:           </Transition.target>
37:           <Transition.stateMachine>
38:             <StateMachine xmi.idref="004"/>
39:           </Transition.stateMachine>
40:         </Transition>
41:       </advice>
42:     </pointcut>
43:     <pointcut.XMLextension>
44:       <advice.Bundle type="insert">
45:         <Bundle:StateMachine xmi.idref="004">
46:           <Action xmi.idref="026" name="pdf2tiff">
47:             <action class="jp.co.rrr.function.pdf2tiff"/>
48:             <property name="type" value="size" type="string"/>
49:           </Action>
50:           <Transition xmi.idref="021" name="Conversion End">
51:             <transition class="jp.co.rrr.function.convertEnd"/>
52:           </Transition>
53:         </Bundle:StateMachine>
54:       </advice>
55:     </pointcut>
56:   </aspect>
57: </aspectSM>
```

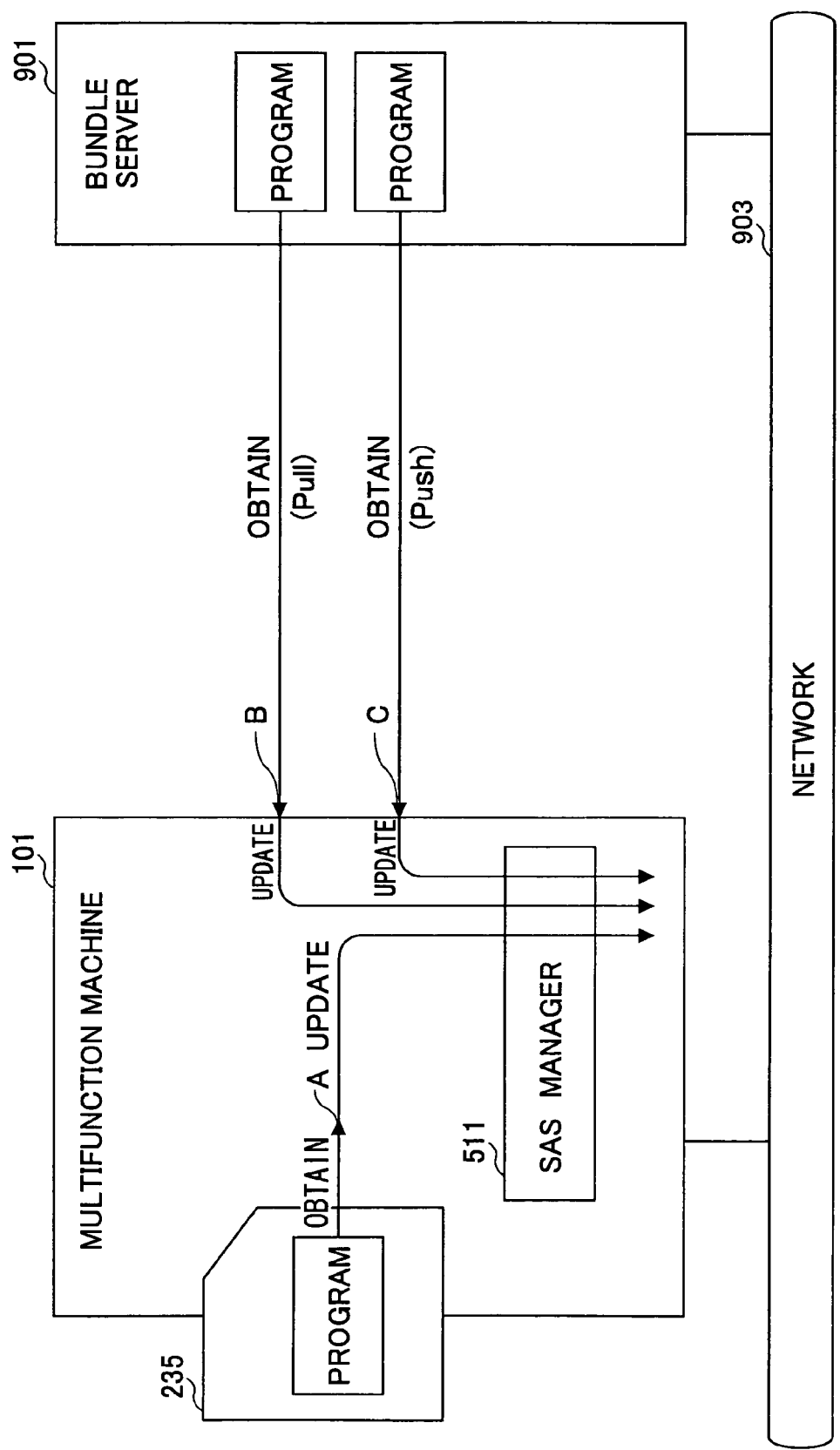

IMAGE FORMING APPARATUS, INFORMATION PROCESSING METHOD, AND RECORDING MEDIUM FOR DIRECTLY UPDATE A MODULE OF THE IMAGE FORMING APPARATUS WITHOUT CHANGING OTHER MODULES

BACKGROUND OF THE INVENTION

1. Field of the Invention

The present invention relates generally to image forming apparatuses such as copiers, printers, scanners, facsimile machines, and multifunction machines; image processing methods; and recording media such as SD memory cards.

2. Description of the Related Art

In these years, multifunction machines having a copying function, a printing function, a scanning function, and a facsimile function are commercially available. The multifunction machine prints an image on printing paper in the case of functioning as a copier or printer, reads an image from original material such as a document in the case of functioning a copier or scanner, and exchanges an image with another apparatus through a telephone line in the case of functioning a facsimile machine. Such a multifunction machine is disclosed in, for example, Japanese Laid-Open Patent Application No. 2002-84383.

In these years, various programs are installed in the multifunction machine. In the multifunction machine, these programs should be updated in some cases, for example, in the case of extending the functions of the machine or correcting bugs of the programs. In the conventional multifunction machine, usually, a program is updated at the time of starting the machine. Therefore, there is a problem in that it is necessary to restart the machine in order to update a program. If the machine is manually restarted, a restarting operation is forced upon a user, thus imposing an operational work load on the user. However, if the machine is automatically restarted, the restarting operation is performed without the user knowing it, thus psychologically making things uncomfortable for the user.

SUMMARY OF THE INVENTION

Embodiments of the present invention may solve or reduce one or more of the above-described problems.

According to one embodiment of the present invention, there are provided an image forming apparatus and an information processing method in which the above-described problems are solved, and a recording medium on which a program for causing a computer to execute such a method is recorded.

According to one embodiment of the present invention, in regard to an image forming apparatus in which various programs are installed, there is provided a novel method related to updating the various programs installed in the image forming apparatus.

According to one embodiment of the present invention, there is provided an image forming apparatus executing a program configured by connecting a plurality of modules operating exclusively with respect to each other, the image forming apparatus including: an input part configured to receive an input of updating information of the program; a determination part configured to determine whether an operating state of the program corresponds to a time for updating specified in the updating information; and a change part configured to change a relationship of connection of the modules in accordance with the updating information if the determination part determines that the operating state of the program corresponds to the time for updating.

According to such an image forming apparatus, it is possible to provide a new method related to updating various programs.

According to one embodiment of the present invention, there is provided an information processing method executed by an image forming apparatus executing a program configured by connecting a plurality of modules operating exclusively with respect to each other, the information processing method including: receiving an input of updating information of the program; determining whether an operating state of the program corresponds to a time for updating specified in the updating information; and changing a relationship of connection of the modules in accordance with the updating information if said determining determines that the operating state of the program corresponds to the time for updating.

According to one embodiment of the present invention, there is provided a computer-readable recording medium on which is recorded an information processing program for causing a computer to execute the information processing method as described above.

Thus, according to one aspect of the present invention, regarding an image forming apparatus in which various programs are installed, there is provided a new method related to updating the programs installed in the image forming apparatus.

BRIEF DESCRIPTION OF THE DRAWINGS

Other objects, features and advantages of the present invention will become more apparent from the following detailed description when read in conjunction with the accompanying drawings, in which:

FIG. 15 is a diagram showing a definition of state transition information of the bundle service "FaxTx1" according to the embodiment of the present invention;

FIG. 16 is a diagram showing the definition of the state transition information of the bundle service "FaxTx1" according to the embodiment of the present invention;

FIG. 19 is a diagram showing a description of an AspectSM according to the embodiment of the present invention;

FIG. 25 is a diagram for illustrating methods of obtaining modules for updating the bundle applications and the bundle services according to the embodiment of the present invention.

DETAILED DESCRIPTION OF THE PREFERRED EMBODIMENTS

A description is given below, with reference to the accompanying drawings, of an embodiment of the present invention.

Figure 1:
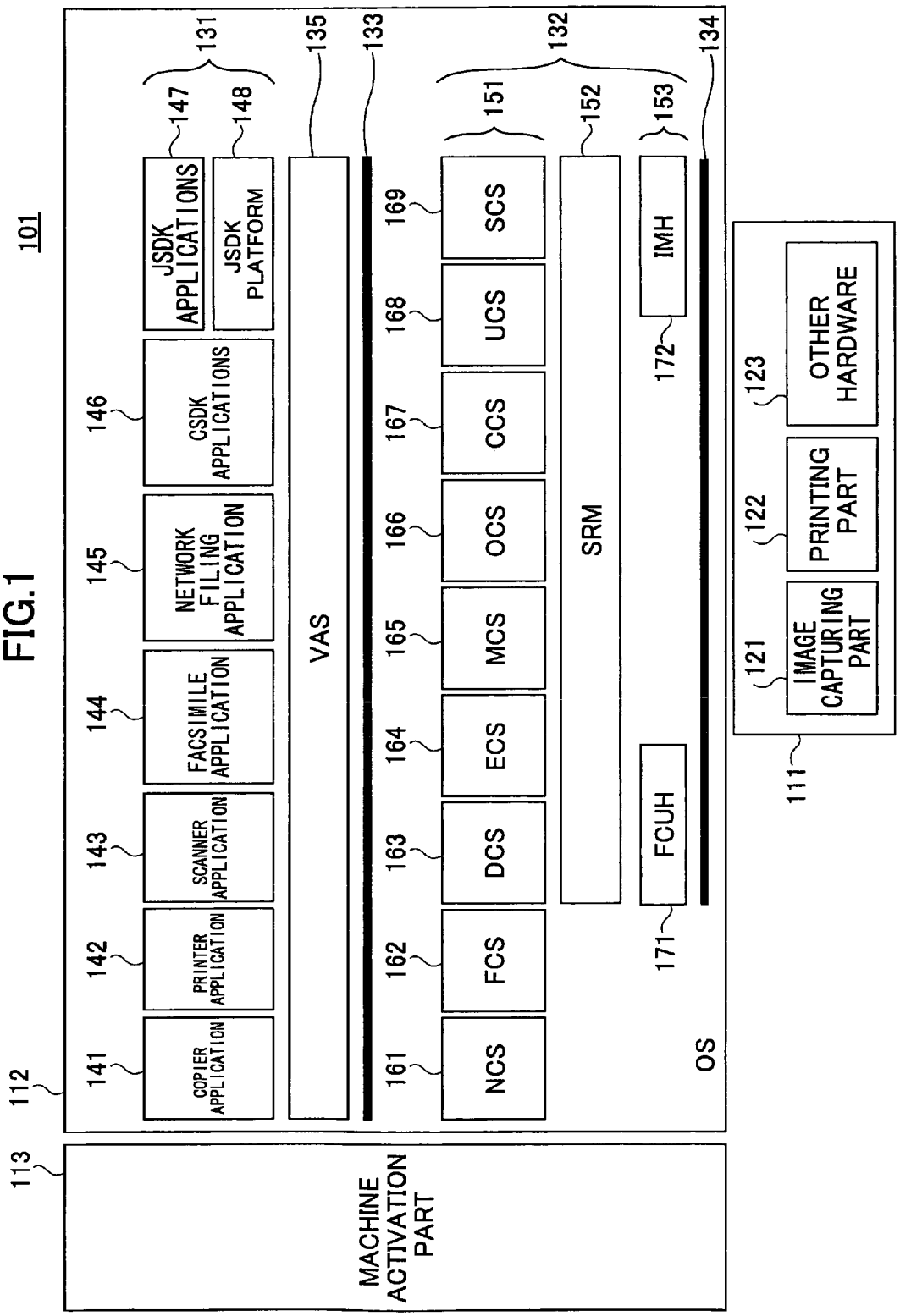
FIG. 1 is a block diagram showing a multifunction machine according to an embodiment of the present invention.

FIG. 1 is a block diagram showing a multifunction machine 101 according to the embodiment of the present invention. The multifunction machine 101 of FIG. 1 includes various hardware items 111, various software items 112, and a multifunction machine activation part 113.

The hardware items 111 of the multifunction machine 101 include an image capturing part 121, a printing part 122, and other hardware 123. The image capturing part 121 is hardware for reading an image (image data) from original material such as a document. Hereinafter, the original material is simply referred to as "original." The printing part 122 is hardware for printing an image (image data) on printing paper.

The software items 112 of the multifunction machine 101 include various applications 131 and various platforms 132. These programs are executed in parallel process by process by an OS (operating system) such as UNIX (registered trademark).

The applications 131 include a copier application 141 for a copier, a printer application 142 for a printer, a scanner application 143 for a scanner, a facsimile application 144 for a facsimile machine, and a network filing application 145 for network filing.

The applications 131 can be developed using a dedicated SDK (Software Development Kit). Those of the applications 131 developed using the SDK are referred to as SDK applications. As dedicated SDKs, a CSDK for developing applications with C and a JSDK for developing applications with Java (registered trademark) are provided. Applications developed using the CSDK are referred to as CSDK applications, and applications developed using the JSDK are referred to as JSDK applications. The multifunction machine 101 of FIG. 1 includes one or more CSDK applications 146 and one or more JSDK applications 147. The multifunction machine 101 further includes a JSDK platform 148 as software for intermediating between the JSDK applications 147 written in Java (registered trademark) and other software 112 written in C.

The platforms 132 includes various control services 151, a system resource manager (SRM) 152, and various handlers 153. The control services 151 include a network control service (NCS) 161, a facsimile control service (FCS) 162, a delivery control service (DCS) 163, an engine control service (ECS) 164, a memory control service (MCS) 165, an operations panel control service (OCS) 166, a certification control service (CCS) 167, a user directory control service (UCS) 168, and a system control service (SCS) 169. The handlers 153 include a facsimile control unit handler (FCUH) 171 and an image memory handler (IMH) 172.

The process of the NCS 161 intermediates between network communications. The process of the FCS 162 provides a facsimile API. The process of the DCS 163 performs control related to distribution of stored documents. The process of the ECS 164 performs control related to the image capturing part 121 and the printing part 122. The process of the MCS 165 performs control related to a memory or hard disk drive. The process of the OCS 166 performs control related to an operations panel. The process of CCS 167 performs control related to authentication and billing. The process of the UCS 168 performs control related to management of user information. The process of the SCS 169 performs control related to system management.

The software items 112 include a virtual application service (VAS) 135 as software intermediating between the applications 131 and the platforms 132. The VAS 135 operates as a server process having the applications 131 as clients, and also operates as a client process having the platforms 132 as servers. The VAS 135 has a wrapping function that hides the platforms 132 from the applications 131, and assumes the role of absorbing a version difference caused by upgrading the platforms 132.

The multifunction machine activation part 113 is operated first when the multifunction machine 101 is turned ON. Thereby, the OS such as UNIX (registered trademark) is started, so that the applications 131 and the platforms 132 are started. These programs are stored in a hard disk drive or memory card, and are reproduced therefrom to be loaded into memory.

Figure 2:
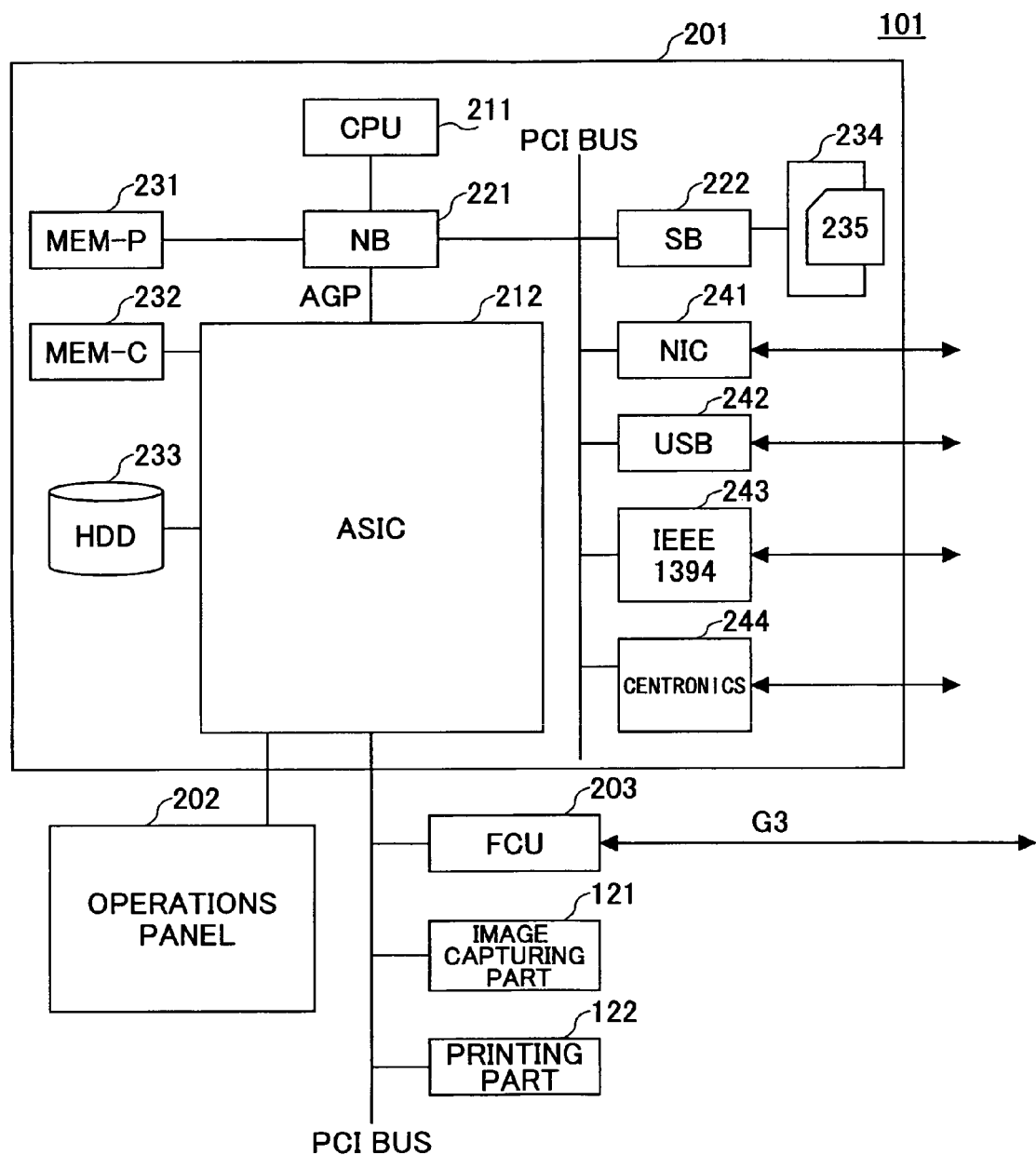
FIG. 2 is a block diagram showing a hardware configuration of the multifunction machine of FIG. 1 according to the embodiment of the present invention.

FIG. 2 is a block diagram showing a hardware configuration of the multifunction machine 101 of FIG. 1. The hardware items 111 of the multifunction machine 101 include a controller 201, an operations panel 202, a facsimile control unit (FCU) 203, the image capturing part 121, and the printing part 122.

The controller 201 includes a CPU 211, an ASIC 212, an NB (Northbridge) 221, an SB (Southbridge) 222, a MEM-P 231, a MEM-C 232, an HDD (Hard Disk Drive) 233, a memory card slot 234, an NIC (Network Interface Controller) 241, a USB device 242, an IEEE 1394 device 243, and a Centronics device 244.

The CPU 211 is an IC for performing a variety of information processing tasks. The ASIC 212 is an IC for performing a variety of image processing tasks. The NB 221 is the Northbridge of the controller 201. The SB 222 is the Southbridge of the controller 201. The MEM-P 231 is the system memory of the multifunction machine 101. The MEM-C 232 is the local memory of the multifunction machine 101. The HDD 233 is a storage unit of the multifunction machine 101. The memory card slot 234 is a slot for inserting a memory card 235. The NIC 241 is a controller for network communications using MAC addresses. The USB device 242 provides a USB-compliant connection terminal. The IEEE 1394 device 243 provides an IEEE 1394-compliant connection terminal. The Centronics device 244 provides a Centronics connection terminal.

The operations panel 202 is hardware (an operations part) for an operator making input to the multifunction machine 101, and is also hardware (a display part) for the operator obtaining output from the multifunction machine 101.

Figure 3:
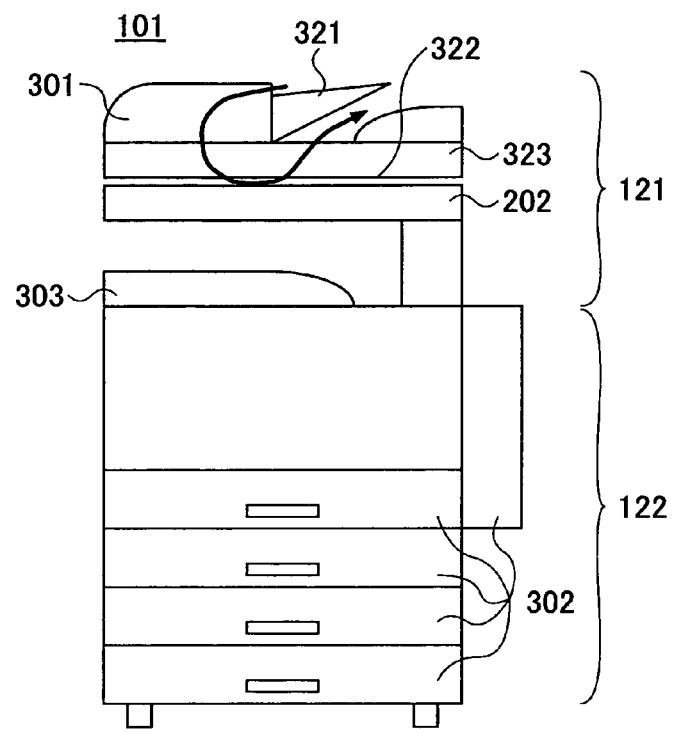
FIG. 3 is a diagram showing an example of the appearance of the multifunction machine of FIG. 1 according to the embodiment of the present invention.

FIG. 3 is a diagram showing an example of the appearance of the multifunction machine 101 of FIG. 1. FIG. 3 graphically shows the position of the image capturing part 121, the position of the printing part 122, and the position of the operations panel 202. Referring to FIG. 3, the multifunction machine 101 further includes an original setting part 301 in which an original is set, a paper feed part 302 to which printing paper is supplied and from which the printing paper is fed, and a paper output part 303 to which the printing paper is output.

Figure 4:
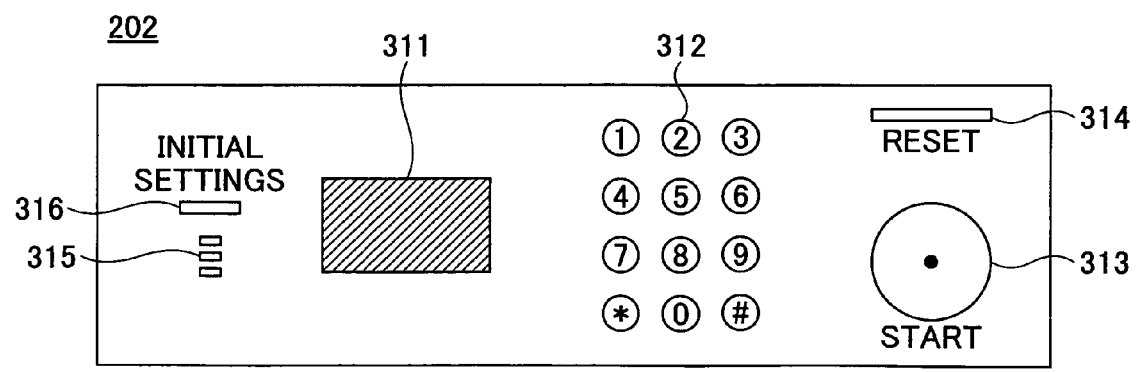
FIG. 4 is a diagram showing an operations panel of the multifunction machine of FIG. 1 according to the embodiment of the present invention.

FIG. 4 is a diagram showing the operations panel 202. Referring to FIG. 4, the operations panel 202 includes a touch panel 311, numeric keys 312, a start button 313, a reset button 314, function keys 315, and an initial settings button 316. The touch panel 311 is hardware (a touch operations part) for making input by touch operations, and is also hardware (a screen display part) for obtaining output in the form of screen display. The numeric keys 312 are hardware for inputting numbers by key (button) operations. The start button 313 is hardware for performing a start operation by a button operation. The reset button 314 is hardware for performing a reset operation by a button operation. The function keys 315 are hardware for causing operations screen by the CSDK applications 146 and the JSDK applications 147 to be displayed by key (button) operations. The initial settings button 316 is hardware for causing an initial settings screen to be displayed by a button operation.

Referring back to FIG. 3, the original setting part 301 includes an ADF (Automatic Document Feeder) 321, a flatbed 322, and a flatbed cover 323. The paper feed part 302 includes four paper feed trays. The paper output part 303 includes a single paper output tray.

[CSDK/JSDK/OSGi]

Figure 5:
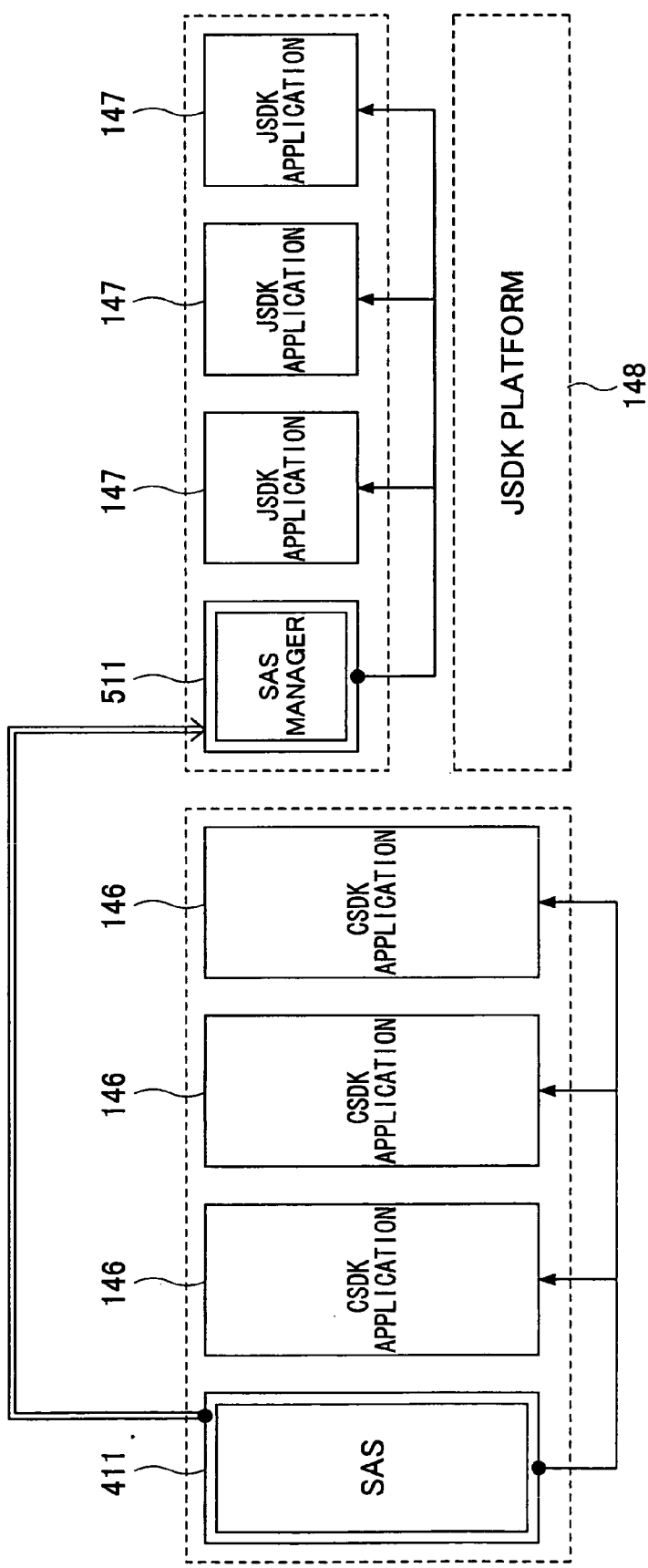
FIG. 5 is a block diagram showing a software configuration of CSDK applications and JSDK applications of FIG. 1 according to the embodiment of the present invention.

FIG. 5 is a block diagram showing a software configuration of the CSDK applications 146 and the JSDK applications 147 of FIG. 1. The CSDK applications 146 are C applications, and are executed as respective processes. The JSDK applications 147 are Java (registered trademark) applications, and are executed as respective threads.

In the multifunction machine 101 of FIG. 1, the CSDK applications 146 include an SAS (SDK Application Service) 411 that controls the other CSDK applications 146, and the JSDK applications 147 include an SAS manager 511 that controls the other JSDK applications 147. Since the CSDK applications 146 are executed as processes and the JSDK applications 147 are executed as threads, an application management mechanism for the CSDK applications 146 and an application management mechanism for the JSDK applications 147 are separately provided. The SAS 411 and the SAS manager 511 control starting, starting cancellation, installation, uninstallation, and updating of the CSDK applications 146 and the JSDK application 147, respectively.

The SAS 411 can not only control the CSDK applications 146 but also control the JSDK applications 147 through the SAS manager 511. The SAS 411 can directly control the CSDK applications 146, and can control the JSDK applications 147 indirectly through the SAS manager 511. Thus, the application management mechanism for the CSDK applications 146 and the application management mechanism for the JSDK applications 147 are integrated by providing the SAS 411 with the function of controlling the SAS manager 511. Since the fundamental part of the software of the multifunction apparatus 101 is based on C, it is preferable to concentrate the function of controlling SDK applications in the SAS 411 that is also based on C.

Figure 6:
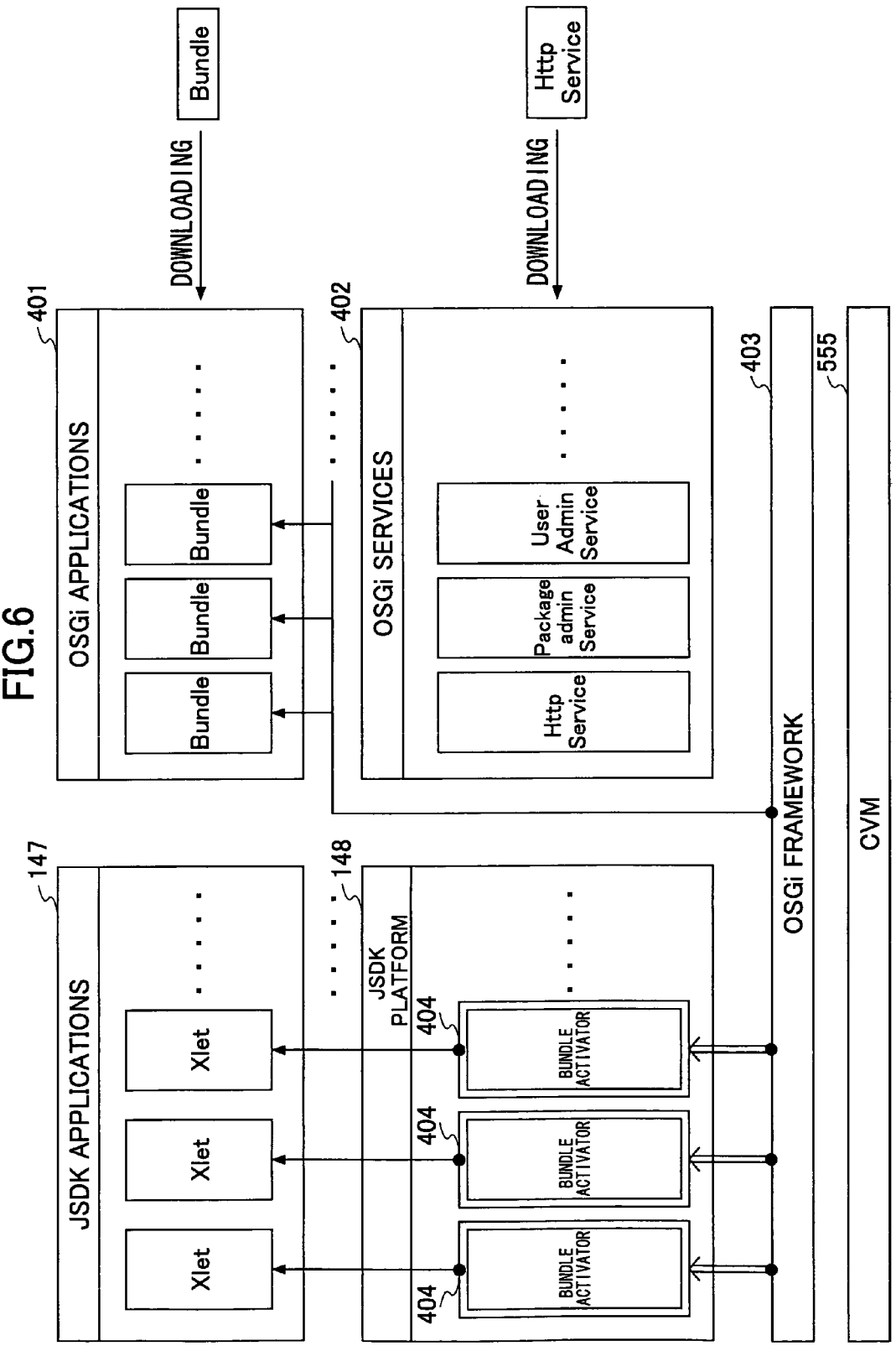
FIG. 6 is a block diagram for illustrating an OSGi service platform in the multifunction machine of FIG. 1 according to the embodiment of the present invention.

FIG. 6 is a block diagram for illustrating an OSGi (Open Service Gateway initiative) service platform in the multifunction machine 101 of FIG. 1. The OSGi service platform, which is a standardization technique by the OSGi alliance, is an open component-based software integration technique based on Java (registered trademark). In an apparatus having an OSGi service platform, Java (registered trademark) software is installed in the form of a software component called "bundle." The functions of the apparatus can be configured with bundles, and can be updated, customized, and maintained by downloading bundles.

As Java (registered trademark) software, the multifunction machine 101 of FIG. 1 includes the JSDK applications 147, the JSDK platform 148, OSGi applications 401 for OSGi, OSGi services 402 for OSGi, and an OSGi framework 403 for managing bundles (managing the life cycles and the data of bundles).

With respect to the OSGi applications 401 and the JSDK applications 147, the OSGi applications 401 are installed in the multifunction machine 101 in the form of bundles, while the JSDK applications 147 are installed in the multifunction machine 101 but not in the form of bundles in order to free the vender(s) of the JSDK applications 147 from the burden of converting the JSDK applications 147 into bundles and installing them. Instead, bundle activators 404 that convert the JSDK applications 147 into bundles are provided in the JSDK platform 148. The OSGi framework 403 manages the OSGi applications 401 installed in the multifunction machine 101 in the form of bundles, and manages the JSDK applications 147 that are installed in the multifunction machine 101 but not in the form of bundles so as to be converted into bundles by the bundle activators 404. Thus, the application management mechanism for the OSGi applications 401 and the application management mechanism for the JSDK applications 147 are integrated by providing both the OSGi framework 403 and the bundle activators 404. Thereby, unified management of Java (registered trademark) applications is realized.

The OSGi framework 403 manages the bundles forming the OSGi services 402 and manages the bundles forming the JSDK platform 148. Thus, unified management of Java (registered trademark) software is realized. Here, each OSGi application 401 is either a servlet or JSP. Further, the JSDK applications 147 are Xlets.

The JSDK applications 147 may be installed in the form of bundles as well. Further, it is also possible that the JSDK applications 147 may be installed either in the form of bundles or not in the form of bundles. Those of the JSDK applications 147 that are installed in the form of bundles are not required to be converted into bundles by the bundle activators 404.

The multifunction machine 101 further includes a CVM 555.

[Updating]

A description is given below of updating Java software (registered trademark) managed as bundles. First, a description is given of updating the JSDK platform 148 in the multifunction machine 101 of FIG. 1. Then, a description is given of updating the JSDK applications (bundle applications) 147 in the multifunction machine 101 of FIG. 1. The JSDK platform 148 and the JSDK applications (bundle applications) 147 in the multifunction machine 101 are updated by the SAS manager 511 therein. The JSDK platform 148 includes one or more bundle services. In the following description, the bundle services of the JSDK platform 148 are also referred to by the same reference numeral 148.

Figure 7:
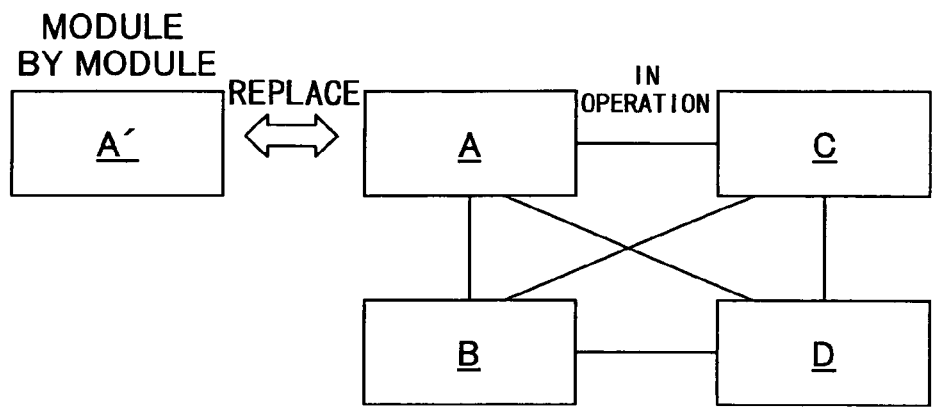
FIG. 7 is a diagram showing an object configuration of a bundle service according to the embodiment of the present invention.

FIG. 7 is a diagram showing an object configuration of a bundle service 148, which may be any of the bundle services 148. The bundle service 148 includes four objects (modules) A, B, C, and D.

If the objects A, B, C, and D are interrelated, it is difficult to replace the object A with an object A' while the bundle service 148 is being executed (in operation). This is because the objects B, C, and D may be referring to the object A in order to use a service provided by the object A. Therefore, in the case of replacing the object A with the object A', it is necessary to notify the objects B, C, and D that the object A is to be replaced with the object A', and thereby to cause the objects B, C, and D to switch the referent from the object A to the object A'. Accordingly, conventionally, it is necessary to restart the multifunction machine in order to perform updating such as replacement of the object A with the object A' on the bundle service 148 on the basis of each module thereof (module by module) while the bundle service 148 is in operation.

However, the multifunction machine 101 updates the bundle service 148 module by module without being restarted while the bundle service 148 is in operation. Therefore, in updating the bundle service 148, a user is no longer forced to restart the multifunction machine 101 nor is the multifunction machine 101 restarted without the user knowing it.

That is, the multifunction machine 101 updates the bundle service 148 when the object of a part of the bundle service 148 to be updated is not active (not in operation). Thereby, the multifunction machine 101 can update the bundle service 148 module by module without being restarted while the bundle service 148 is in operation.

A description is given below of a specific case of updating the bundle service 148 where a bundle service "FaxTx1" is updated to a bundle service "FaxTx2." The bundle service "FaxTx1" provides the service of transmitting image data by facsimile. The bundle service "FaxTx2" provides the service of converting image data from PDF to TIFF and transmitting the converted image data by facsimile.

Figure 8:
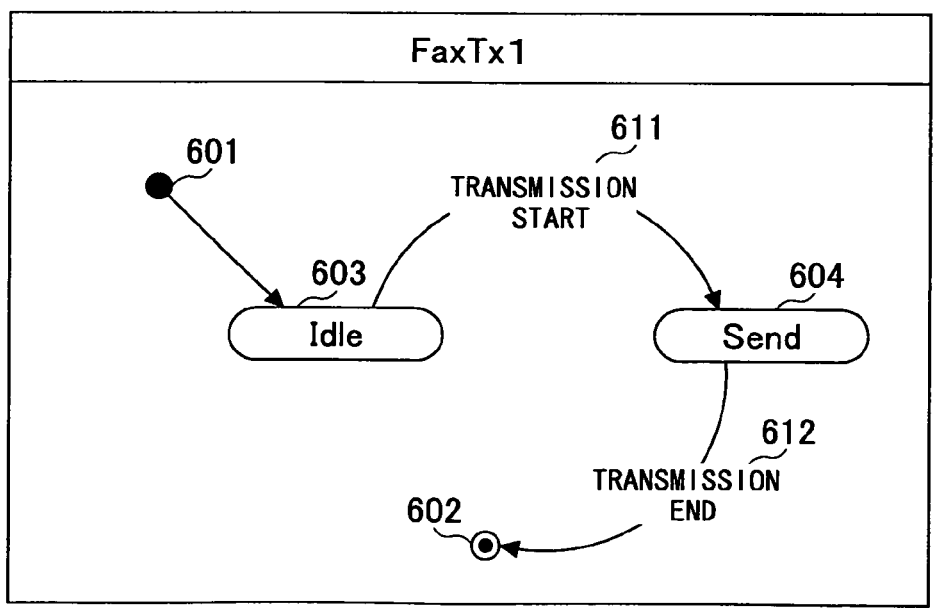
FIG. 8 is a state transition diagram of a bundle service "FaxTx1" according to the embodiment of the present invention.

FIG. 8 is a state transition diagram of the bundle service "FaxTx1." The states of "FaxTx1" include an initial state 601, a final state 602, an Idle state 603, and a Send state 604. The Idle state 603 is a state where facsimile transmission is being awaited. The Send state 604 is a state where facsimile transmission is being performed. Transition from the Idle state 603 to the Send state 604 is caused by a transmission start event 611. Transition from the Send state 604 to the final state 602 is caused by a transmission end event 612.

Figure 9:
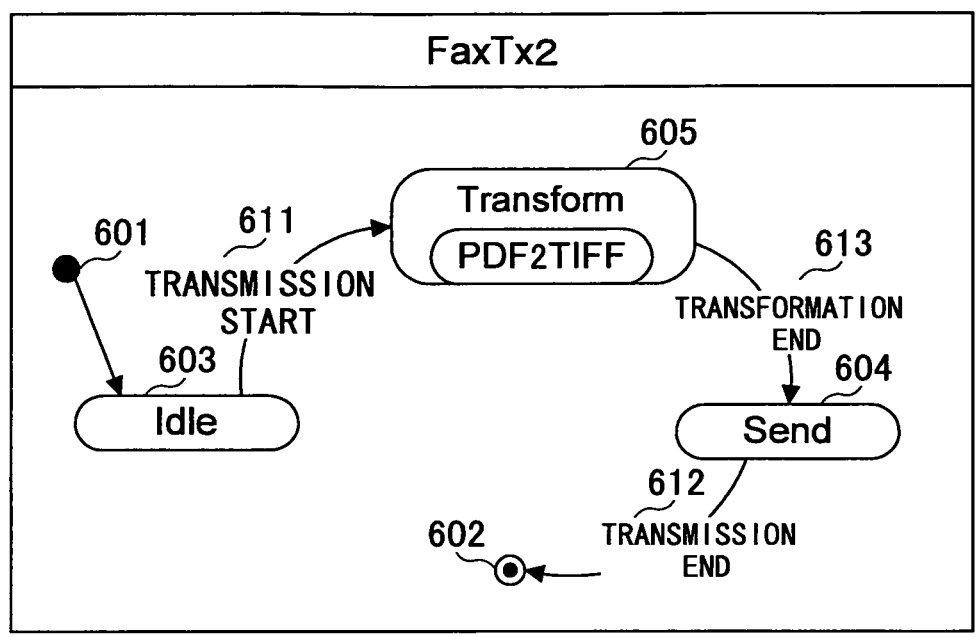
FIG. 9 is a state transition diagram of a bundle service "FaxTx2" according to the embodiment of the present invention.

FIG. 9 is a state transition diagram of the bundle service "FaxTx2." In addition to the initial state 601, the final state 602, the Idle state 603, and the Send state 604, "FaxTx2" includes a Transform state 605. The Transform state 605 is a state where transformation (conversion) from PDF to TIFF is being performed. The Idle state 603 is a state where facsimile transmission is being awaited. The Send state 604 is a state where facsimile transmission is being performed. Transition from the Idle state 603 to the Transform state 605 is caused by the transmission start event 611. Transition from the Transform state 605 to the Send state 604 is caused by a transformation (conversion) end event 613.

Figure 10:
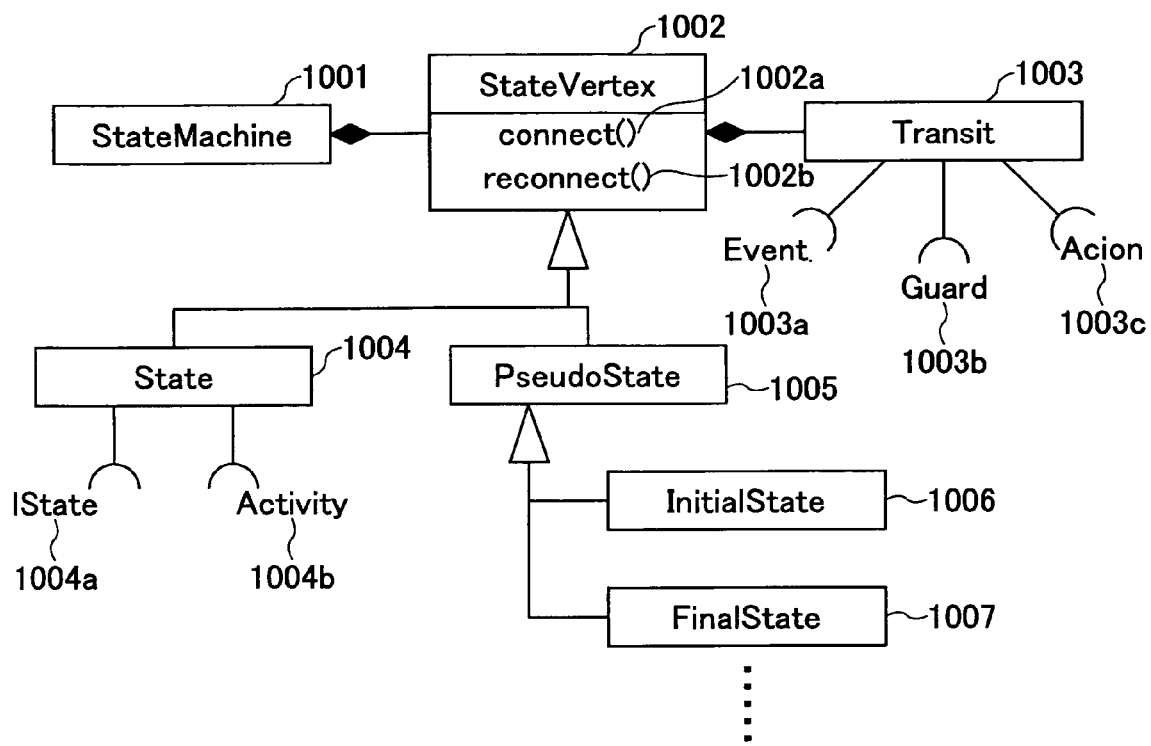
FIG. 10 is a diagram showing classes forming the bundle service according to the embodiment of the present invention.

Based on a state transition diagram, the bundle service 148 according to this embodiment is modeled on a group of classes as shown in FIG. 10. FIG. 10 is a diagram showing classes forming the bundle service 148.

In FIG. 10, a StateMachine class 1001 represents the single bundle service 148. That is, the objects representing the bundle service "FaxTx1" or "FaxTx2" are generated as the instances (StateMachine objects) of the StateMachine class 1001. A StateVertex class 1002, which is an abstract class, corresponds to a root class in the classes representing states in a state transition diagram. Methods such as a connect method 1002a and a reconnect method 1002b are defined in the StateVertex class 1002. The connect method 1002a establishes a connection to a state to which a transition is made and a connection to the state transition. State transition is represented by a Transit class 1003. Accordingly, more specifically, the connect method 1002a is a class that establishes a connection to a StateVertex object (in a precise sense, an object of a subclass of the StateVertex class 1002) and a connection to a Transit object (hereinafter referred to as "transition object") corresponding to the state transition. Hereinafter, StateVertex objects and the objects of the subclasses of the StateVertex class 1002 are collectively referred to as "state objects." The connections here are realized by retaining, for example, a state object to which a transition is to be made (a transition target [destination] state object) or its identification information (ID, reference, pointer, etc.) in a state object. The reconnect method 1002b changes a transition target. Interfaces such as an Event interface 1003a, a Guard interface 1003b, and an Activity interface 1003c are defined in the transit class 1003. The Event interface 1003a is an interface for implementing a transition event of state transition. The Guard interface 1003b is an interface for implementing a guard condition. The Action interface 1003c is an interface for implementing an action executed at the time of state transition.

A State class 1004 and a PseudoState class 1005 are defined as subclasses as the StateVertex class 1002. For example, the State class 1004 represents a state defined in accordance with the bundle service 148. Interfaces such as an IState interface 1004a and an Activity interface 1004b are defined in the State class 1004. The IState interface 1004a is an interface for implementing processing at the time of entry into a state (entry processing) and processing at the time of exit from the state (exit processing). The Activity interface 1004b is an interface for implementing processing performed during the state. These interfaces are implemented as classes. Accordingly, for example, the processing of the Activity interface 1004b is implemented in an Activity class.

The PseudoState class 1005 represents pseudo states such as an initial state and a final state as its name suggests. The subclasses of the PseudoState class 1005 include an InitialState class 1006 representing an initial state and a FinalState class 1007 representing a final state.

A description is given of the relationships among the above-described classes. The StateMachine class 1001 aggregates the StateVertex class 1002. This represents that a single bundle service has one or more states. The StateVertex class 1002 aggregates the Transit class 1003. This represents that states are connected by a transition.

Based on the model as described above, the bundle services "FaxTx1" and "FaxTx2" are configured with the following objects.

Figure 11:
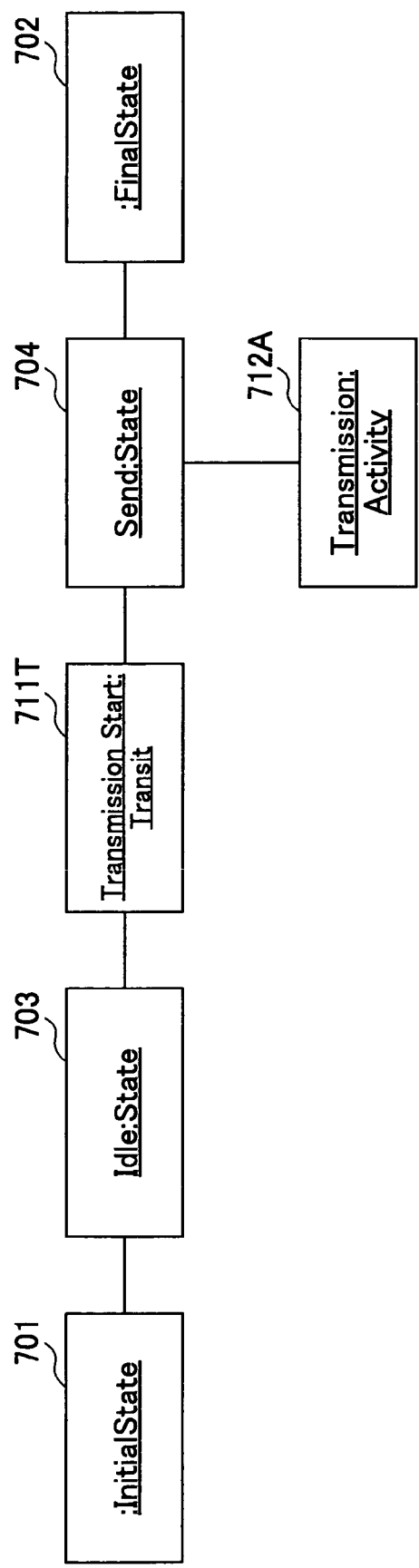
FIG. 11 is a diagram showing an object configuration of the bundle service "FaxTx1" according to the embodiment of the present invention.

FIG. 11 is a diagram showing an object configuration of the bundle service "FaxTx1." The bundle service "FaxTx1" includes an Initial State object (:InitialState) 701, a Final State object (:FinalState) 702, an Idle State object (Idle:State) 703, a Send State object (Send:State) 704, a Transmission Start object (Transmission Start:Transit) 711T, and a Transmission object (Transmission:Activity) 712A based on the state transition diagram of FIG. 8.

Figure 12:
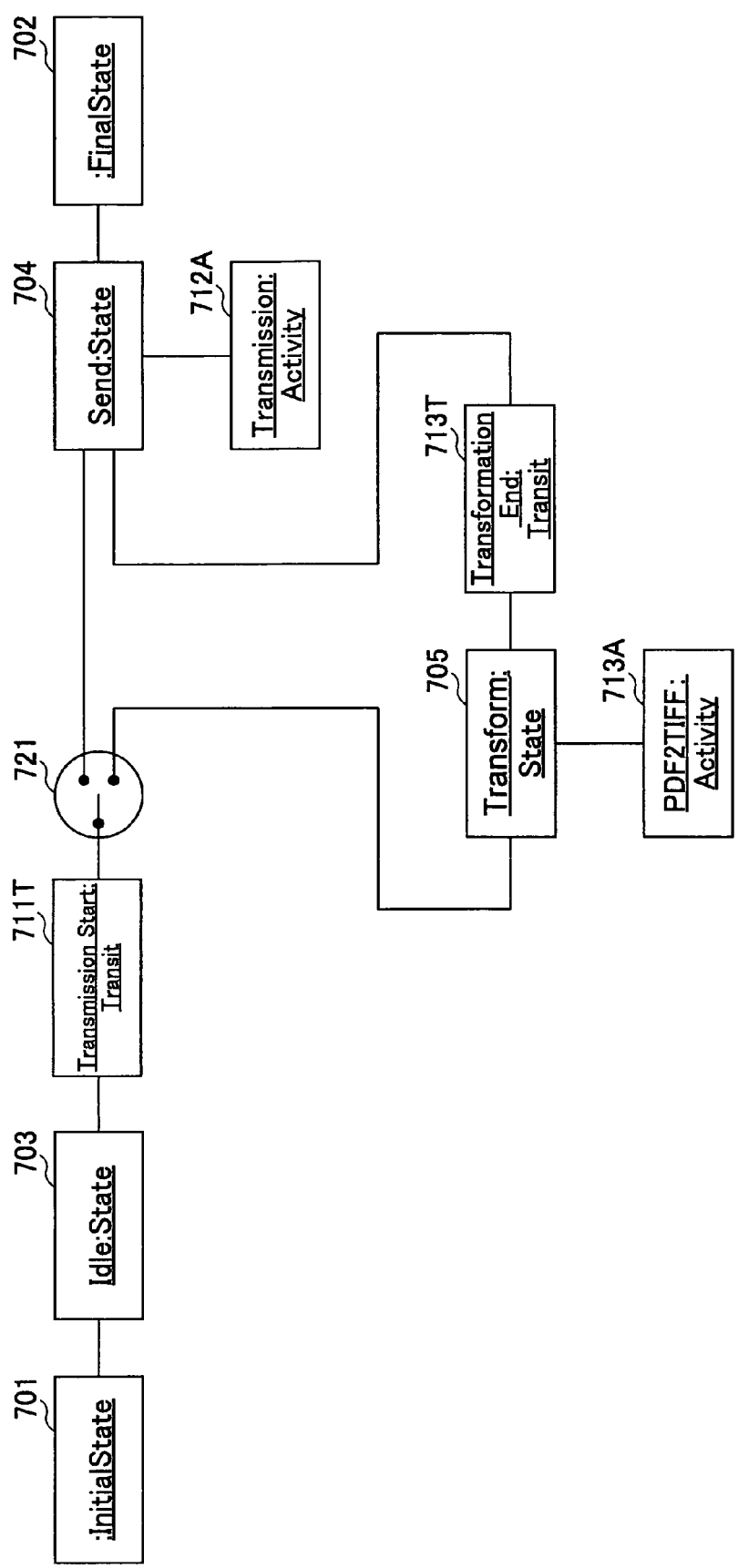
FIG. 12 is a diagram showing an object configuration of the bundle service "FaxTx2" according to the embodiment of the present invention.

Further, FIG. 12 is a diagram showing an object configuration of the bundle service "FaxTx2." The bundle service "FaxTx2" includes the Initial State object 701, the Final State object 702, the Idle State object 703, the Send State object 704, a Transform State object (Transform:State) 705, the Transmission Start object 711T, the Transmission object 712A, a Transformation object (PDF2TIFF) 713A, and a Transformation End object (Transformation End:Transit) 713T based on the state transition diagram of FIG. 9.

In FIGS. 11 and 12, a line segment connecting objects represents the reference relationship of the objects. A state object from which a transition is made (a transition source [origin] state object) refers to a state object to which the transition is made (a transition target state object). In FIGS. 11 and 12, a transition object is connected between state objects in some parts. For example, the Transmission Start object 711T is connected between the Idle State object 703 and the Send State object 704. However, this does not mean that the Idle State 703 does not refer to the Send State object 704. This represents that the Idle State object 703 refers to the Send State object 703 and also refers to the Transmission Start object 711T as a transition object corresponding to the state transition.

FIGS. 11 and 12 show that updating the bundle service from "FaxTx1" to "FaxTx2" can be realized by adding objects for updating, such as the Transform State object 705, the Transformation object 713A, and the Transformation End object 713T, to "FaxTx1."

The objects of the updated part of the bundle service 148 are noticeably affected by the updating of the bundle service 148. The objects of the updated part of the bundle service 148 refer to objects connected to replacing objects or added objects (an updated part of the bundle service 148). In the updating from FIG. 11 to FIG. 12, an added part such as a switch 721 (FIG. 12) corresponds to the updated part of the bundle service 148, and the Send State object 704 and the Transmission Start object 711T correspond to the objects of the updated part of the bundle service 148.

The states of an object are classified into an active state where services are exchanged and an inactive state where no service is exchanged. In order to update the bundle service 148 while the bundle service 148 is in operation, updating may be performed while the objects of a part of the bundle service 148 to be updated are not in the active state (that is, in the inactive state). This is because the exchange of services between objects during the operation of the bundle service 148 is not hindered by the updating. Therefore, the bundle service 148 is updated when the objects of part of the bundle service 148 to be updated are not in the active state. In modeling based on a state transition diagram, if one object is in the active state, the other objects are limited to the inactive state. That is, the objects perform processing (operate) exclusively with respect to each other.

Figure 13:
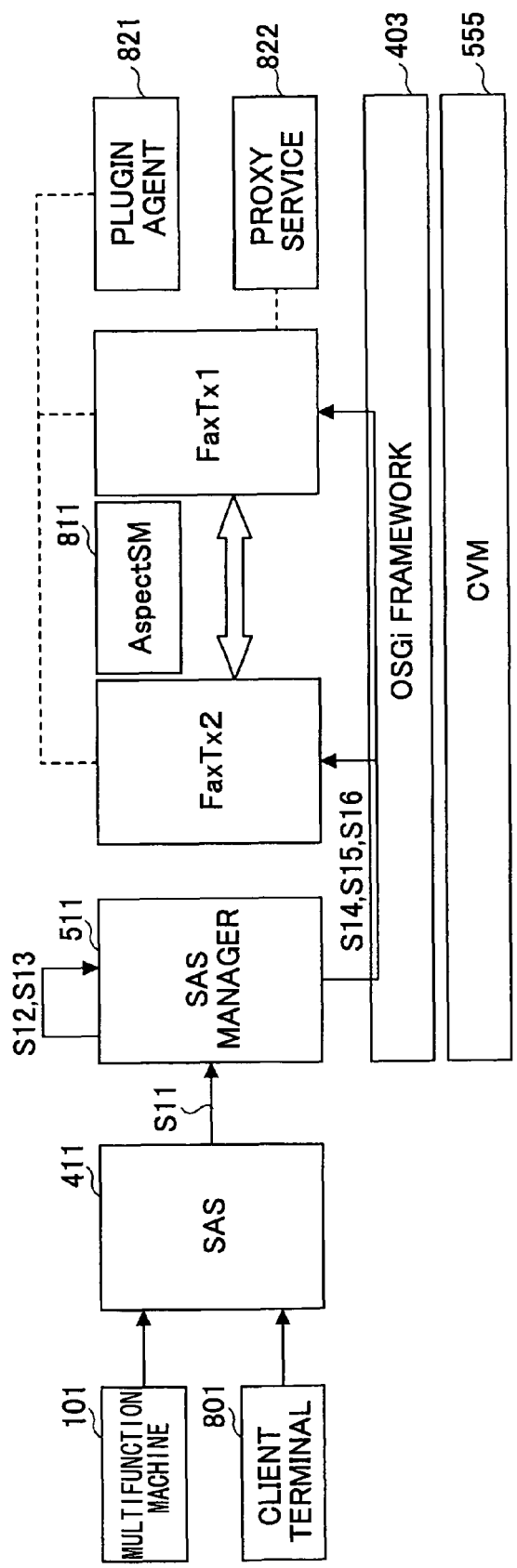
FIG. 13 is a collaboration diagram related to updating the bundle service according to the embodiment of the present invention.

FIG. 13 is a collaboration diagram related to updating the bundle service 148. The processing of FIG. 13 updates the bundle service 148 from "FaxTx1" to "FaxTx2."

When an updating operation for updating FaxTx1 to FaxTx2 is performed on the operations screen of the multifunction machine 101 or a client terminal 801, in step S11, a request to update FaxTx1 to FaxTx2 is transmitted from the SAS 411 to the SAS manager 511. Next, in step S12, the SAS manager 511 determines whether it is possible to update FaxTx1 to FaxTx2. Next, in step S13, the SAS manager 511 determines whether it is possible to install a module for updating in the multifunction machine 101.

Next, in step S14, the SAS manager 511 installs the module for updating in the multifunction machine 101. Next, in step S15, the SAS manager 511 causes the module for updating to make a transition to an active state. Next, in step S16, the SAS manager 511 adds the module for updating to FaxTx1, and causes the switch 721 to switch from the FaxTx1 side to the FaxTx2 side, thereby generating FaxTx2.

A time at which updating is performed is written in an XML file 811 called AspectSM included in the module for updating. Further, intermediation control between FaxTx1 or FaxTx2 and the JSDK applications 147 is executed by a proxy service 822 forming the JSDK platform 148.

A description is given in more detail of updating FaxTx1 to FaxTx2. Before a detailed description is given of the updating itself, a description is given of the process of constructing the object configuration of FaxTx1 shown in FIG. 11.

Figure 14:
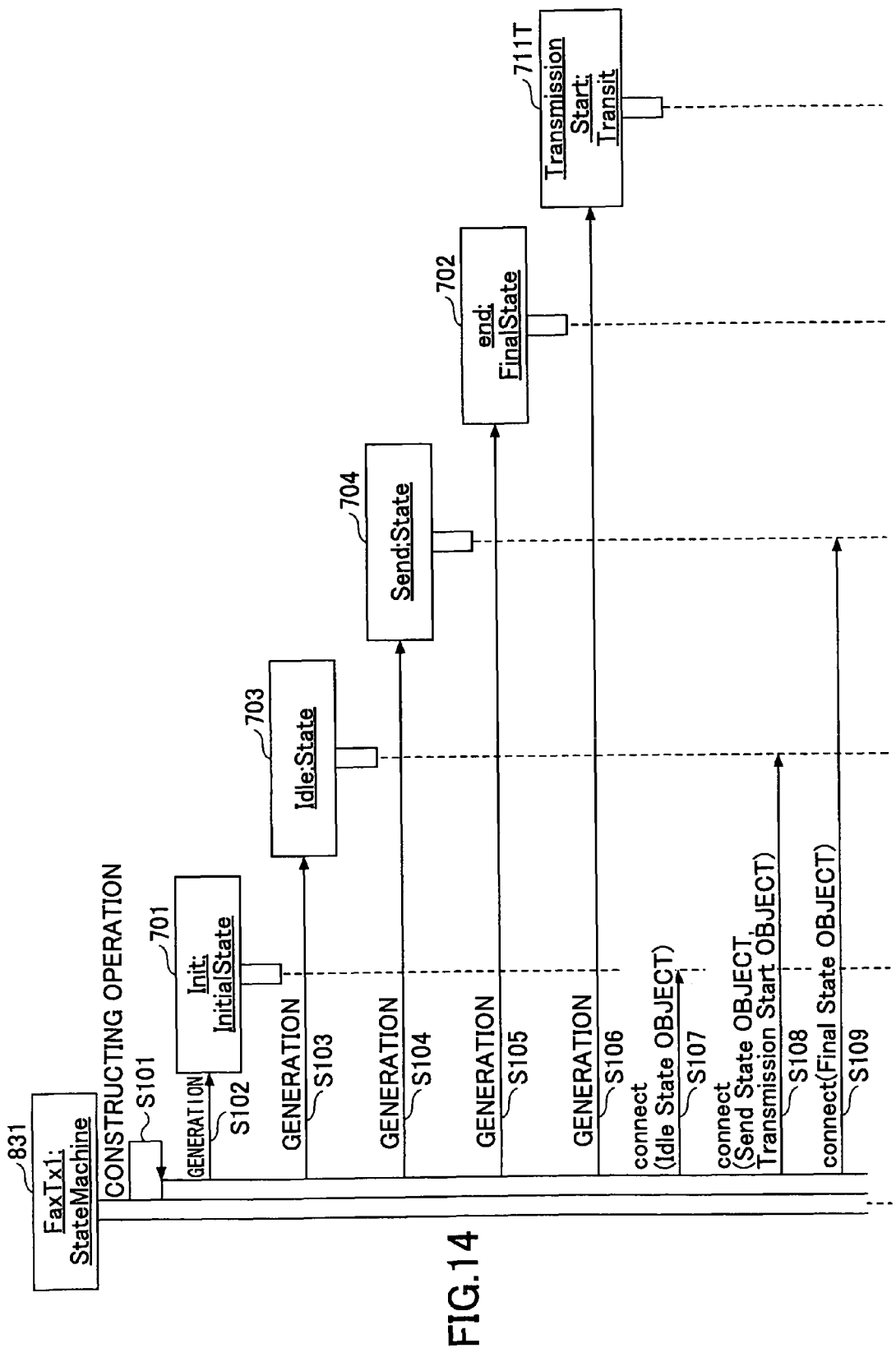
FIG. 14 is a sequence diagram for illustrating the operation of constructing the object configuration of the bundle service "FaxTx1" according to the embodiment of the present invention.

FIG. 14 is a sequence diagram for illustrating the operation of constructing the object configuration of the bundle service "FaxTx1." The operation of FIG. 14 is performed when a FaxTx1 object (FaxTx1:StateMachine) 831 is instantiated.

When the FaxTx1 object 831 is instantiated, in step S101, the FaxTx1 object 831 constructs an object configuration corresponding to the state transitions of the bundle service "FaxTx1" based on information on the state transitions (state transition information). The state transition information is stored, for example, in a predetermined storage unit of the multifunction machine 101 in the following format.

FIGS. 15 and 16 are diagrams showing a definition of the state transition information of the bundle service "FaxTx1." FIGS. 15 and 16 show a description of single-item state transition information 900. In this description, the state transition information 900 is written in accordance with XMI (XML Metadata Interchange). XMI is a standard for exchanging models in XML documents among various software items. In implementation of this embodiment, however, the state transition information does not always have to be written in accordance with XMI. Line numbers are added in the drawings for convenience of description.

The state transition information 900 is defined as corresponding to the bundle service "FaxTx1" by the tag name of a <StateMachine> tag and the value of its name attribute ("FaxTx1") at line 121 of the state transition information 900. Further, the value ("004") of an xmi.id attribute in the <StateMachine> tag is an ID for identifying the bundle service "FaxTx1."

A <CompositeState> tag at line 125 corresponds to a declaration of a start of state definition in the bundle service "FaxTx1." The declaration is identified by the value ("017") of xmi.id of the <CompositeState> tag.

A Pseudostate element 910 enclosed by <Pseudostate> tags at lines 130-137 is the definition of the initial state 601

(FIG. 9). In the Pseudostate element 910, "Init" is set as the value of its name attribute, and "018" is set as the value of its xmi.id element.

A CompositeState element 920 at lines 138-148 is the definition of the Send state 604 (FIG. 9). In the CompositeState element 920, "Send" is set as the value of its name attribute, and "019" is set as the value of its xmi.id element.

A CompositeState element 930 at lines 149-159 is the definition of the Idle state 603 (FIG. 9). In the CompositeState element 930, "Idle" is set as the value of its name attribute, and "022" is set as the value of its xmi.id element.

A Pseudostate element 940 at lines 160-183 is the definition of the final state 602 (FIG. 9). In the Pseudostate element 940, "end" is set as the value of its name attribute, and "024" is set as the value of its xmi.id element.

At lines 191-228, the state transitions in the bundle service "FaxTx1" are defined. That is, a Transition element 950 at lines 191-204 is the definition of a state transition from the Idle state 603 to the Send state 604. That the Transition element 950 is the definition of this state transition is determined from a Transition.source element 951 and a Transition.target element 952 defined as child elements of the Transition element 950. The Transition.source element 951 is an element in which the state of a transition source is set. The value of the xmi.idref attribute of the child element of the Transition.source element 951 is "022." This shows that the transition source is in the state where the value of the xmi.idref attribute is "022," that is, in the Idle state 603. Further, the Transition.target element 952 is an element where the state of a transition target is set. The value of the xmi.idref attribute of the child element of the Transition.source element 951 is "019." This shows that the transition target is in the state where the value of the xmi.idref attribute is "019," that is, in the Send state 604. The value of the name attribute of the Transition element 950 is "Transmission Start" and the value of the xmi.id attribute of the Transition element 950 is "023."

A Transition element 960 at lines 205-218 is the definition of a state transition from the Send state 604 to the final state 602. That the Transition element 960 is the definition of this state transition is specified from the fact that the value of an xmi.idref attribute in a Transition.source element 961 is "019" (the Send state 604) and that the value of an xmi.idref attribute in a Transition.target element 962 is "024" (the final state 602). The value of the name attribute of the Transition element 960 is "Transmission End," and the value of the xmi.id attribute of the Transition element 960 is "020."

A Transition element 970 at lines 219-228 is the definition of a state transition from the initial state 601 to the Idle state 603. That the Transition element 970 is the definition of this state transition is specified from the fact that the value of an xmi.idref attribute in a Transition.source element 971 is "018" (the initial state 601) and that the value of an xmi.idref attribute in a Transition.target element 972 is "022" (the Idle state 603). The value of the xmi.id attribute of the Transition element 970 is "018."

A description is given of line 130 et seq. Each of the Pseudostate element 910, the CompositeState element 920, and the CompositeState element 930 corresponding to their respective states includes at least one of a StateVertex.outgoing element and a StateVertex.incoming element as a child element. The StateVertex.outgoing element defines a connection to a state transition from a transition source. The StateVertex.incoming element defines a connection to a state transition to a transition target.

For example, in the Pseudostate element 910 corresponding to the initial state 601, the value of the xmi.idref attribute of the child element of a StateVertex.outgoing element 911 is "018." This shows that the state transition to a transition target from the initial state 601 corresponds to the state transition to which the Transition element 970 corresponds.

Further, in the CompositeState element 920 corresponding to the Send state 604, the value of the xmi.idref attribute of the child element of a StateVertex.outgoing element 921 is "020," and the value of the xmi.idref attribute of the child element of a StateVertex.incoming element 922 is "023." This shows that the state transition to a transition target from the Send state 604 corresponds to the state transition to which the Transition element 960 corresponds, and that the state transition of a transition source corresponds to the state transition to which the Transition element 950 corresponds.

One or more connections to state transitions are also defined in the same manner in the CompositeState element 930 corresponding to the Idle state 603 and the Pseudostate element 940 corresponding to the final state 602.

Based on the above-described state transition information, the FaxTx1 object 831 first instantiate each state object and each transition object. FIG. 14 shows the case where the Initial State object 701, the Idle State object 703, the Send State object 704, the Final State object 702, and the Transmission Start object 711T are generated in steps S102, S103, S104, S105, and S106 based on the Pseudostate element 910, the CompositeState element 930, the CompositeState element 920, the Pseudostate element 940, and the Transition element 950, respectively, in the state transition information 900.

Next, the FaxTx1 object 831 connect each transition source state object to a corresponding transition target state object so that the reference relationships of the state objects are in the order of state transitions defined in the state transition information 900. For example, in step S107, the FaxTx1 object 831 calls the connect( ) method of the Initial State object 701 with the identification information of the Idle State object 703 specified as an argument. Further, in step S108, the FaxTx1 object 831 calls the connect( ) method of the Idle State object 703 with the identification information of the Send State object 704 specified as an argument. Further, in step S109, the FaxTx1 object 831 calls the connect( ) method of the Send State object 704 with the identification information of the Final State object 702 specified as an argument. Each state object whose connect( ) method has been called retains the identification information specified as an argument in the state object.

The identification information of a transition object is also specified as the argument of a connect( ) method as required. For example, when the connect( ) method of the Idle State object 703 is called in step S108, the identification information of the Transmission Start object 711T is also specified as an argument. If the identification information of both a state object and a transition object is thus specified as the arguments of a connect( ) method, the state object of the called method correlates (pairs) the identification information of the state object and the identification information of the transition object, and retains the correlated (paired) identification information. As a result, if a state object is active, a state object of its transition target at the time of occurrence of a certain event can be identified.

By the above-described operation, the object configuration as shown in FIG. 11 is constructed with respect to the bundle service "FaxTx1."

Figure 17:
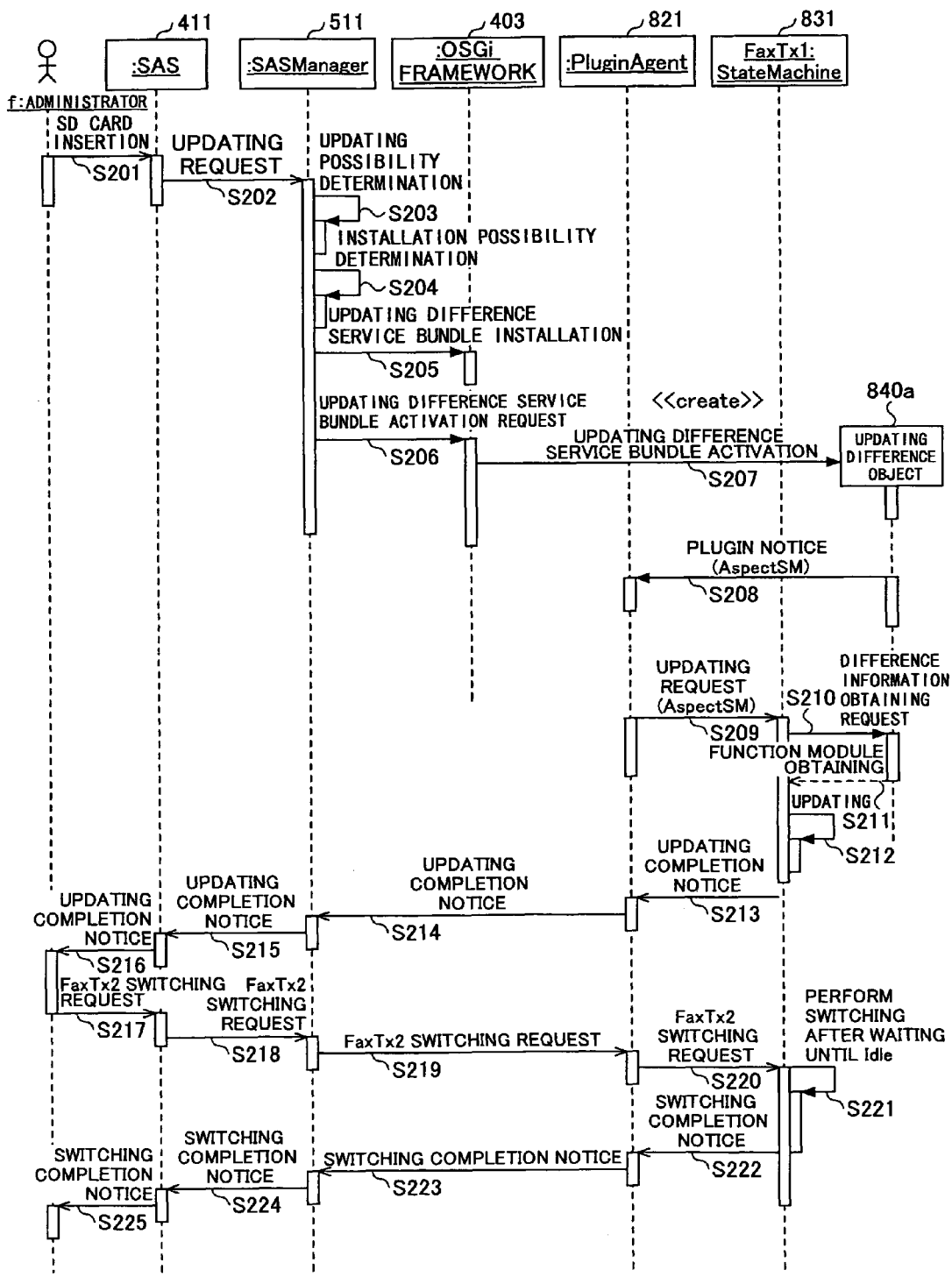
FIG. 17 is a sequence diagram for illustrating the updating of FaxTx1 to FaxTx2 according to the embodiment of the present invention.

Based on the above, a description is given in detail of updating the bundle service "FaxTx1" to "FaxTx2." FIG. 17 is a sequence diagram for illustrating updating of FaxTx1 to FaxTx2.

For example, in step S201, an administrator inserts an SD card storing an additional module of the difference between FaxTx2 and FaxTx1 into the memory card slot 234 (FIG. 2) of the multifunction machine 101.

Figure 18:
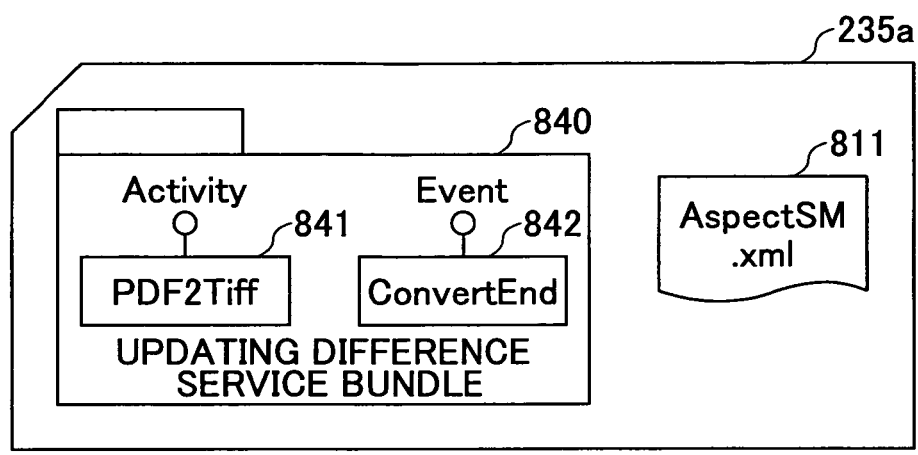
FIG. 18 is a diagram showing a configuration of an additional module in an SD card according to the embodiment of the present invention.

FIG. 18 is a diagram showing a configuration of the additional module in the SD card. FIG. 18 shows an SD card 235a storing an updating difference service bundle 840 and the AspectSM.xml file (AspectSM) 811 (FIG. 13). The updating difference service bundle 840 stores a function module (for example, a Java [registered trademark] class file) in which one or more of the classes corresponding to the IState interface 1004a, the Activity interface 1004b, the Event interface 1003a, the Guard interface 1003b, and the Action interface 1003c in the class diagram of FIG. 10 required to be added in performing updating are implemented. Hereinafter, the function module is referred to as "additional module." Here, PDF2Tiff 841 and ConvertEnd 842 are stored as additional modules.

The AspectSM 811 is a file in which specifications as to how to perform updating from FaxTx1 to FaxTx2 are written in XML format.

FIG. 19 is a diagram showing a description of the AspectSM 811. In FIG. 19, line numbers are added for convenience of description. Changes to the state transition information 900 of the bundle service "FaxTx1" (FIGS. 15 and 16) are written in the AspectSM 811.

In the description of the AspectSM 811, line 2 instructs FaxTx1 whose xmi.id value is "004" to make a change to state transitions. That is, xmi.id of a bundle service to be updated is specified as the xmi.idref attribute at line 2.

At lines 3-20, change information regarding a first part to be changed is written. At line 3, the part to be changed and a time at which the change is to be made (a change timing) are specified. The part to be changed is specified by the description of <xxx> in pointcut.<xxx> and the value of an xmi.idref attribute. Here, the part of <xxx> is "CompositeState" and the value of the xmi.idref attribute is "017." Accordingly, a change in the <CompositeState> tag at line 125 of the state transition information 900 is specified. Further, the change timing is specified by the value of a timing attribute. Here, "Idle" is specified. Accordingly, it is specified that the change should be made when FaxTx1 is in the Idle state 603.

At line 4, the contents of the change are specified. That is, it is specified, by what is subsequent to "advice." in the tag name of the <advice.CompositeState> tag, that the CompositeState element is to be changed. Further, it is specified by a type attribute that the type of the change is "insert" (insertion). That is, lines 3 and 4 determine that a new CompositeState element should be inserted into the <CompositeState> tag.

Lines 5-18 are the definition of a CompositeState element 850 that is to be inserted. The CompositeState element 850 corresponds to the Transform state 605 of FaxTx2. The writing format in the CompositeState element 850 is as described above with reference to FIGS. 15 and 16. That is, the connection to a transition target is defined in a StateVertex.outgoing element 851, which is a child element of the CompositeState element 850, and the connection to a transition source is defined in a StateVertex.incoming element 852, which is a child element of the CompositeState element 850.

The CompositeState element 850 has a State.entry element 853 defined as a child element thereof. The State.entry element 853 is an element in which entry processing in the Transform state 605 to which the CompositeState element 850 corresponds is defined. That is, an Action element 854 is defined as a child element of the CompositeState element 850, and from the xmi.id attribute and the name attribute of the Action element 854, it is specified that the value of the xmi.id attribute is "026" and that processing identified by a name attribute value pdf2tiff is executed.

At lines 21-42, change information regarding a second part to be changed is specified. At line 21, the part to be changed and its change timing are specified. Here, it is specified that the Transition element 950 (FIG. 16) should be changed in the Idle state 603.

Two changes are specified in the second part to be changed. The first change is specified at lines 22-24, and the second change is specified at lines 25-41.

Regarding the first change, it is specified by what is subsequent to "advice." in the tag name of the <advice.Transition.target> tag at line 22 that the Transition.target element 952 is to be changed. Further, it is specified by a type attribute that the type of the change is "modify" (modification). At line 23, a definition after the modification is written with respect to the target of change. That is, the first change is to modify the state transition from the Idle state 603 to the Send state 604 to the state transition from the Idle state 603 to the Transform state 605.

The second change (at lines 25-41) is to insert a Transition element corresponding to a new state transition (a state transition from the Transform state 605 to the Send state 604) in the Idle state 603. This can be read from the above description, and therefore, a line-by-line description thereof is omitted.

Lines 43-55 are an extended description part where a definition based on not a standard but a unique format is made. It is specified by "XMI.extension" subsequent to "pointcut." at line 43 that this part is an extended description. In this embodiment, the correlation between action processing called in state transition processing and a function module (for example, a Java [registered trademark] class) used for event processing is defined in this part.

At line 44, it is specified that the definition of the child element of the element should be inserted ("insert").

Lines 45-49 are the definition to be inserted. At line 45, where Bundle is to be implemented is specified by the value ("004") of the xmi.idref attribute, which is FaxTx1.

At lines 46-49, the relationship between pdf2tiff in the definition of the entry processing (at lines 15-17) of the CompositeState element 850 (at lines 5-18) to be inserted in correspondence to the Transform state 605 and a jp.co.rrr.function.pdf2tiff class in which the processing is actually implemented is defined. As a result, when a transition is made to the Transform state 605 after updating to FaxTx2, jp.co.rrr.function.pdf2tiff is executed. A property element at line 48 is property information at the time when the jp.co.rrr.function.pdf2tiff class is executed.

At lines 50-52, the relationship between a transformation (conversion) end event to serve as a trigger for a state transition from the Transform state 605 to the Send state 604 and a jp.co.rrr.function.covertEnd class is defined. As a result, when a transformation end event is detected during the Transform state 605, the jp.co.rrr.function.covertEnd class is executed. If the result of the execution is TRUE, a transition is made to the Send state 604.

Referring back to FIG. 17, if the insertion of the SD card 235a by the administrator is automatically detected, or if the SD card 235a is inserted and an instruction for updating is input from the operations panel 202 (FIGS. 3 and 4), in step S202, the SAS 411 requests the SAS manager 511 to perform updating. The information recorded in the SD card 235a may be downloaded via a network. In this case, there is no need to use a recording medium such as an SD card.

In step S203, the SAS manager 511 determines whether it is possible to perform updating from FaxTx1 to FaxTx2 with the updating difference service bundle 840 of the inserted SD card 235a. If the updating is performable, in step S204, the SAS manager 511 determines whether it is possible to install the updating difference service bundle 840 in the multifunction machine 101. If the installation is performable, in step S205, the SAS manager 511 installs the updating difference service bundle 840 of the SD card 235a in the OSGi framework 403 (the multifunction machine 101). When the installation of the updating difference service bundle 840 is completed, in step S206, the SAS manager 511 requests the OSGi framework 403 to cause the updating difference service bundle 840 to make a transition to an active state, or to activate the updating difference service bundle 840.

In step S207, the OSGi framework 403 generates the instance of the updating difference service bundle 840 (hereinafter referred to as "updating difference object 840a"), thereby activating the updating difference service bundle 840. In step S208, the updating difference object 840a notifies a plugin agent 821 (FIG. 13), with the AspectSM 811, that the updating difference service bundle 840 has been plugged in.

In step S209, the plugin agent 821 makes a request for updating to FaxTx2 with the AspectSM 811 having been added thereto to the FaxTx1 object 831. In step S210, the FaxTx1 object 831 determines additional modules necessary for updating the service bundle "FaxTx1" to FaxTx2 based on the AspectSM 811, and requests the updating difference object 840a to obtain the additional modules (here, PDF2Tiff 841 and ConvertEnd 842). In step S211, the updating difference object 840a obtains the additional modules, and returns the obtained additional modules to the FaxTx1 object 831.

Next, in step S212, in accordance with the AspectSM 811, the FaxTx1 object 831 updates the object configuration of the bundle service "FaxTx1" to the one corresponding to FaxTx2, and correlates an Activity object newly added by the updating with the additional modules. The operation of step S212 is performed with the timing described in the AspectSM 811.

Next, in step S213, the FaxTx1 object 831 notifies the plugin agent 821 of completion of updating the bundle service "FaxTx1" to "FaxTx2." However, the switch 721 that switches FaxTx1 to FaxTx2 remains switched to FaxTx1.

In steps S214 and S215, the completion of updating is reported to the SAS through the SAS manager 511. In step S216, the SAS 411 causes a message that the updating is completed to be displayed on the operations panel 202 in order to notify the administrator of the completion of updating. In this state, the switch 721 has not been switched to FaxTx2. Therefore, the SAS 411 queries the administrator whether to switch to FaxTx2.

If the administrator inputs an instruction to switch to FaxTx2 through the operations panel 202 in step S217, in step S218, the SAS 411 notifies the SAS manager 511 of a request to switch to FaxTx2. In step S219, the SAS manager 511 makes a request to the plugin agent 821 for switching to FaxTx2. In step S220, the plugin agent 821 instructs the FaxTx1 object 831 to switch its behavior (state transition) to that corresponding to FaxTx2.

The FaxTx1 object 831 waits until the bundle service FaxTx1 enters the Idle State 703. When the transition to the Idle State 703 is made, in step S221, the FaxTx1 object 831 switches its behavior to that corresponding to FaxTx2 by switching the switch 721. When the switching is completed, in step S222, the FaxTx1 object 831 notifies the plugin agent 821 of completion of the switching. In steps S223 and S224, this switching completion notice is transmitted to the SAS 411 through the SAS manager 511. In step S225, in response to the switching completion notice, the SAS 411 causes a message that the switching of the bundle service "FaxTx1" is completed to be displayed on the operations panel 202.

Figure 20:
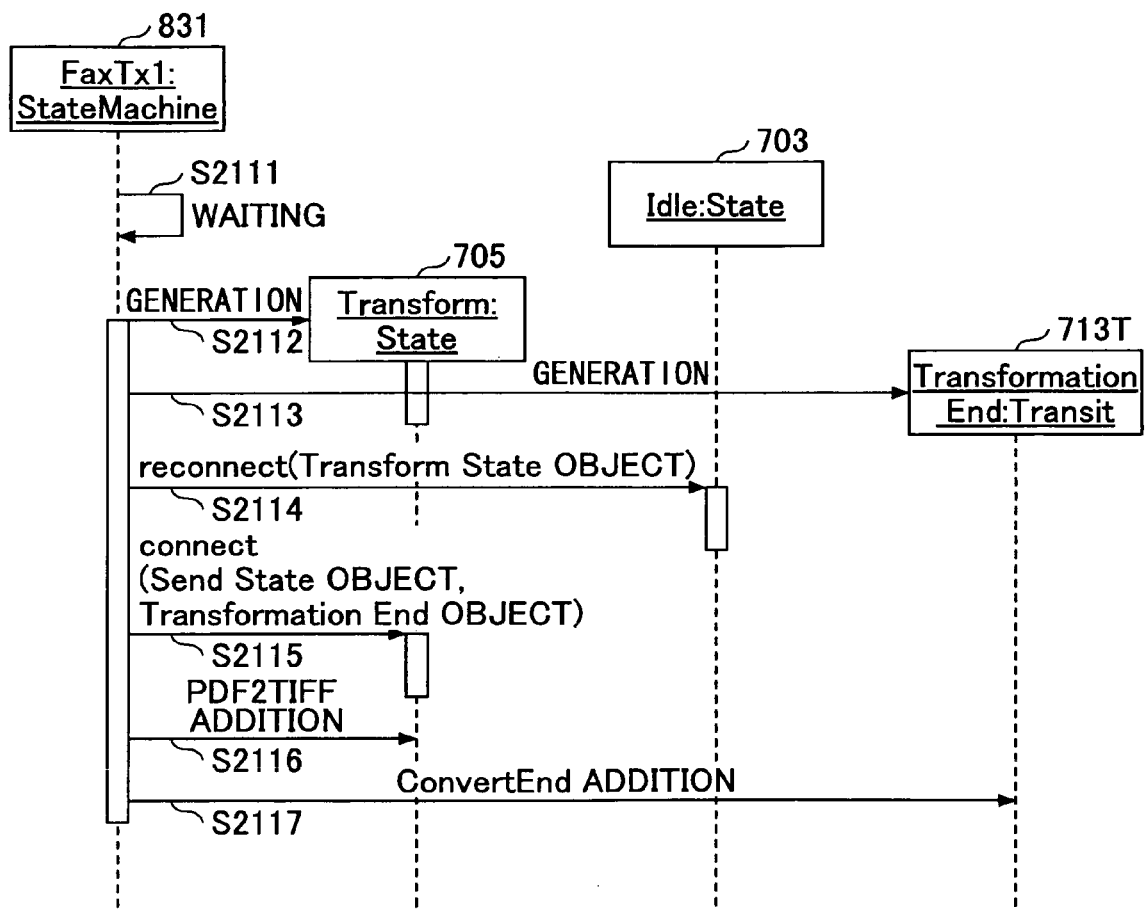
FIG. 20 is a sequence diagram for illustrating updating of the bundle service "FaxTx1" according to the embodiment of the present invention.

Next, a description is given in detail of updating the object configuration of the bundle service "FaxTx1" in step S212. FIG. 20 is a sequence diagram for illustrating updating of the bundle service "FaxTx1."

First, in step S2111, the FaxTx1 object 831 waits until the state of the bundle service "FaxTx1" makes a transition to the state specified by the value of the timing attribute in each part to be changed specified by the AspectSM 831. In the case of the AspectSM 811 of FIG. 19, the Idle state 603 is specified as the change timing for all the parts to be changed. Accordingly, here, the FaxTx1 object 831 waits until the bundle service "FaxTx1" makes a state transition to the Idle state 603.

When the bundle service "FaxTx1" makes a state transition to the Idle state 603, the FaxTx1 object 831 starts updating in accordance with the description of the AspectSM 811.

For example, in step S2112, the FaxTx1 object 831 generates the Transform State object 705 corresponding to the Transform state 605 based on lines 3-20 of the AspectSM 811. Next, in step S2113, the FaxTx1 object 831 generates the Transformation End object 713T based on lines 25-41 of the AspectSM 811. Next, the FaxTx1 object 831 changes the relationship of connection between objects based on lines 9-14 and lines 22-24 of the AspectSM 811. That is, in step S2114, the FaxTx1 object 831 calls the reconnect( ) method of the Idle State object 703 with the identification information of the Transform State object 705 being specified as an argument. In response to this, the Idle State object 704 retains the Send State object 704 and the Transform State object 705 as transition target state objects. This corresponds to the state where the transition target is caused to branch by the switch 721 in FIG. 12. The switch 721 is implemented, for example, as a flag variable that can be referred to by the Idle State object 703. For example, if the value of the flag variable is 0, the transition target is the Send State object 704, and if the value of the flag variable is 1, the transition target is the Transform State object 705. The connection between the Idle State object 703 and the Transform State object 705 is established. As described with reference to FIG. 17, however, at this point, the switch 721 has not been switched. Therefore, the transition target object of the Idle State object 703 remains the Send State object 704 (that is, the bundle service functions as "FaxTx1").

Next, in step S2115, the FaxTx1 object 831 calls the reconnect( ) method of the Transform State object 705 with the identification information of the Send State object 704 and the identification information of the Transformation End object 713T being specified as arguments. In response to this, the Transform State object 705 correlates the identification information of the Send State object 704 with the identification information of the Transformation End object 713T, and retains the correlated identification information. That is, the connection corresponding to a state transition from the Transform state 605 to the Send state 604 at the time of occurrence of a transformation (conversion) end event is constructed.

Next, the FaxTx1 object 831 correlates additional modules with objects based on lines 43-55 of the AspectSM 811. That is, in step S2116, PDF2TIFF 841 is correlated with the interface of entry processing (IState interface 1004a) of the Transform State object 705. Next, in step S2117, ConvertEnd 842 is correlated with the Event interface 1003a of the Transformation End object 713T.

By the above-described operation, the object configuration of the bundle service FaxTx1 is updated to the one as shown in FIG. 12.

As described above with reference to FIG. 19, changes to the state transition information 900 (FIGS. 15 and 16) of the bundle service "FaxTx1" are described in the AspectSM 811. However, as described above, the FaxTx1 object 831 realizes updating not by rewriting the state transition information 900 but by making changes to the objects of the bundle service "FaxTx1" based on the AspectSM 811. As described with reference to FIG. 14, the bundle service "FaxTx1" has its objects constructed based on the state transition information 900. Accordingly, the AspectSM 811 in which the changes to the state transition information 900 are described can be directly applied to the object configuration of the bundle service "FaxTx1." The state transition information 900 may be updated based on the AspectSM 811, and FaxTx1 (strictly speaking, the one updated to FaxTx2) may be reconstructed based on the updated state transition information 900. In this case, however, the object group configuring the bundle service "FaxTx1" is discarded before reconstruction. Accordingly, the reference relationship with an application using the bundle service "FaxTx1" is broken. Therefore, it is preferable to change an existing object configuration as in this embodiment instead of reconstructing an object group.

As described above, after updating, switching between the bundle services "FaxTx1" and "FaxTx2" can be easily performed by switching the switch 721. Accordingly, in the case of switching "FaxTx2" back to "FaxTx1" after updating "FaxTx1" to "FaxTx2," this switching may be realized by switching the switch 721. That is, the value of the flag variable that can be referred to by the Idle State object 703 may be updated. Alternatively, updating from "FaxTx2" to "FaxTx1" may also be performed based on an AspectSM in which an instruction to update "FaxTx2" to "FaxTx1" is described. In this case, the switch 721 is switched at a time described in the AspectSM.

As described above, a bundle service according to this embodiment realizes a service by the transition of state objects. Further, the bundle service is configured so that there is only a limited active object in the process of realizing a service. That is, there exist inactive state objects. On the premise of this configuration, such an update instruction as to cause updating to be performed when a part to be updated is inactive is described in the AspectSM 811. In accordance with this AspectSM 811, updating is performed when the part to be updated is inactive. Accordingly, the bundle service according to this embodiment can update its behavior while the bundle service is being executed. Further, since there is no reconstruction of an object group in updating the behavior of the bundle service, the bundle service can dynamically update its behavior without breaking the reference relationship with the side referring to the bundle service. Accordingly, it is possible to update the behavior of the bundle service without restarting the multifunction machine 101.

In this embodiment, a description is given of the case where the bundle service is designed based on a state transition diagram. However, the programs to which the present invention is applicable are not limited to those in which an object is constructed for each state. The present invention is applicable to any program if it is configured by connecting multiple modules (including objects) that operate exclusively with respect to each other. Here, operating (performing processing) exclusively means ensuring that when a module is in operation (active), the other modules are not in operation (inactive). Such software allows the relationship of connection between inactive modules to be changed, thus allowing application of the updating processing described in this embodiment.

The updating of the bundle service 148 is thus described above, while a description is given below, with reference to FIG. 21, of the updating of a bundle application (JSDK application) 147, which may be any of the bundle applications 147. Unlike in updating the bundle service 148, provision of a service does not present a problem in updating the bundle application 147. Accordingly, updating the bundle application 147 is simpler than updating the bundle service 148.

Figure 21:
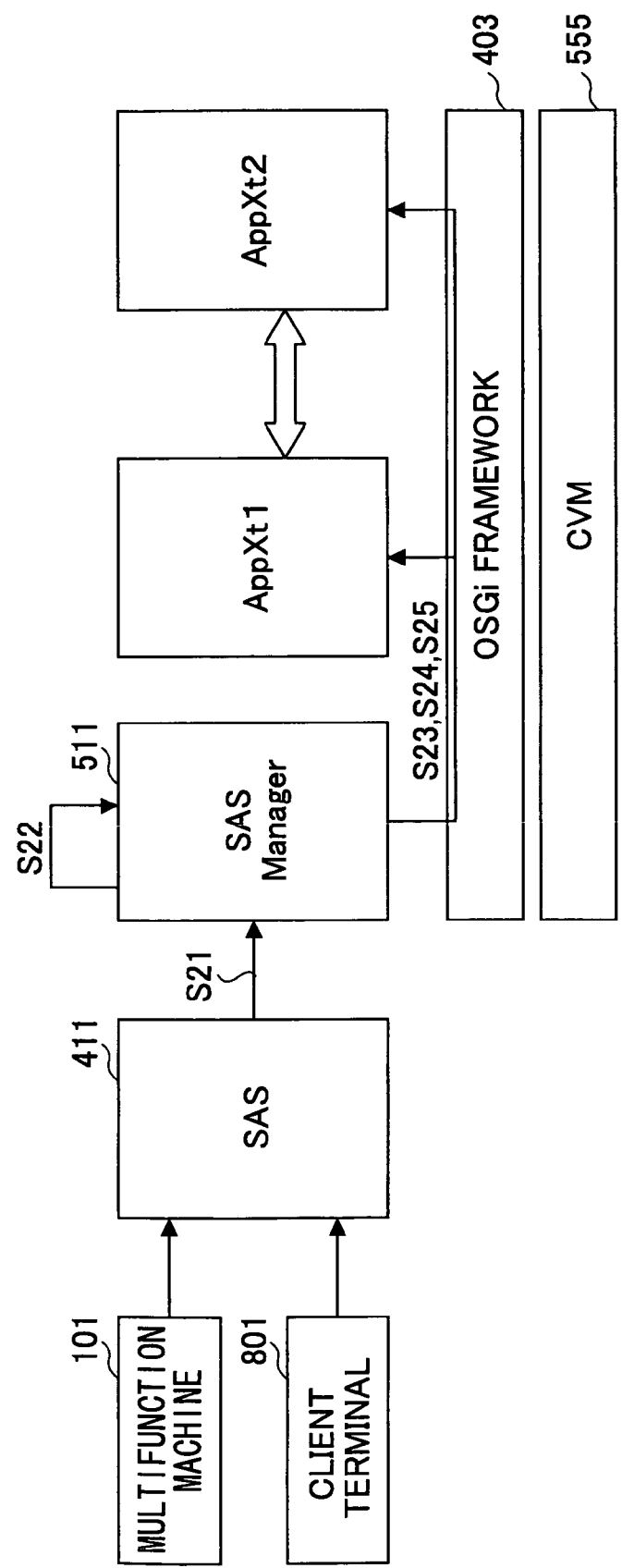
FIG. 21 is a collaboration diagram related to updating a bundle application according to the embodiment of the present invention.

FIG. 21 is a collaboration diagram related to updating the bundle application 147. The updating shown in FIG. 21 updates a bundle application "AppXt1" to a bundle application "AppXt2."

When an updating operation for updating AppXt1 to AppXt2 is performed on the operations screen of the multifunction machine 101 or the client terminal 801, in step S21, a request to update AppXt1 to AppXt2 is transmitted from the SAS 411 to the SAS manager 511. Next, in step S22, the SAS manager 511 determines whether it is possible to install a module for updating in the multifunction machine 101.

Next, in step S23, the SAS manager 511 installs the module for updating in the multifunction machine 101. Next, in step S24, the SAS manager 511 activates the module for updating. Next, in step S25, the SAS manager 511 adds the module for updating to AppXt1, and causes a predetermined switch to switch from the AppXt1 side to the AppXt2 side, thereby generating AppXt2.

The switch may be switched from the AppXt1 side to the AppXt2 side at any time.

The bundle applications 147 and the bundle services 148 are separately described above, while in the following, a description is given of both the bundle applications 147 and the bundle services 148 at the same time.

Figure 22:
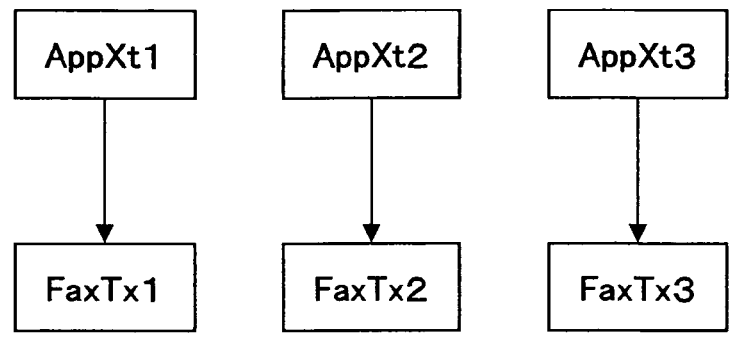
FIG. 22 is a diagram showing a specific example of the relationship of use between the bundle applications and the bundle services according to the embodiment of the present invention.

FIG. 22 is a diagram showing a specific example of the relationship of use between the bundle applications 147 and the bundle services 148. In updating the bundle applications 147 and the bundle services 148, the relationship of use, that is, which bundle application 147 uses which bundle service 148, may be set. FIG. 22 shows the relationship of use where the bundle application "AppXt1" uses the bundle service "FaxTx1," the bundle application "AppXt2" uses the bundle service "FaxTx2," and a bundle application "AppXt3" uses a bundle service "FaxTx3."

Figure 23:
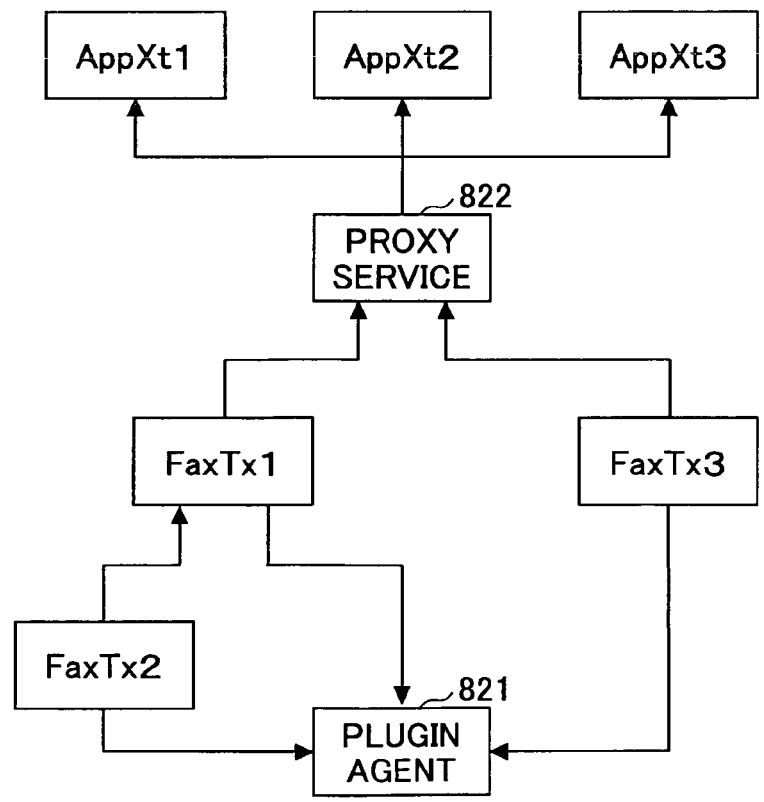
FIG. 23 is a diagram showing the relationship of inheritance among FaxTx1, FaxTx2, and FaxTx3 according to the embodiment of the present invention.

FIG. 23 is a diagram showing the relationship of inheritance among FaxTx1, FaxTx2, and FaxTx3. The relationship of inheritance between FaxTx1 and FaxTx2 is that FaxTx1 is a parent and FaxTx2 is a child. There is no relationship of inheritance between FaxTx3 and either FaxTx1 or FaxTx2. The relationship of inheritance among FaxTx1, FaxTx2, and FaxTx3 affects the processing of the plugin agent 821 and the processing of the proxy service 822.

The plugin agent 821 manages FaxTx1, FaxTx2, and FaxTx3 without using their relationship of inheritance. As shown in FIG. 23, the plugin agent 821 manages FaxTx1, FaxTx2, and FaxTx3 separately from one another. It is in switching control to switch the switch 721 of FaxTx1 and FaxTx2 in the relationship of inheritance from the FaxTx1 side to the FaxTx2 side that the relationship of inheritance affects the processing of the plugin agent 821.

The proxy service 822 records FaxTx1, FaxTx2, and FaxTx3 using their relationship of inheritance. Since FaxTx1 and FaxTx2 are in the relationship of inheritance, parent FaxTx1 is recorded while there is no need to record child FaxTx2 as shown in FIG. 23. Since FaxTx3 has no relationship of inheritance to either FaxTx1 or FaxTx2, FaxTx3 is recorded as shown in FIG. 23. The proxy service 822 performs intermediary control between AppXt1/2/3 and FaxTx1/2/3.

Figure 24:
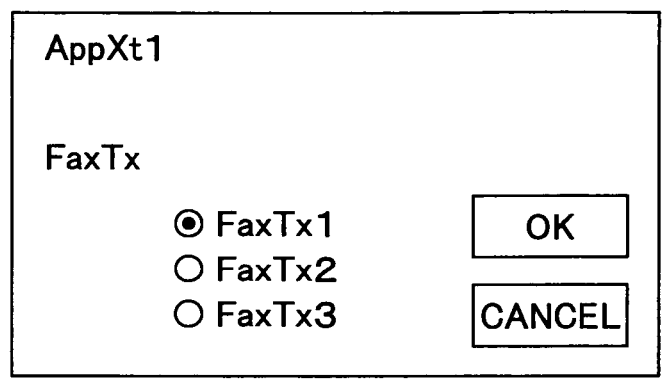
FIG. 24 is a diagram showing a screen for setting the relationship of use according to the embodiment of the present invention.

FIG. 24 is a diagram showing a screen for setting the relationship of use. The setting screen of FIG. 24 is displayed on the display screen of the multifunction machine 101 or the client terminal 801 by the SAS 411. The former is so-called local display, and the latter is so-called remote display. In order to realize remote display, the multifunction machine 101 and the client terminal 801 may be provided with a Web server function and a Web client function, respectively.

The setting screen of FIG. 24 is for determining which of FaxTx1, FaxTx2, and FaxTx3 is to be used by AppXt1. The display information on AppXt1 originates from a JNLP file (application management file) corresponding to the JAR file of AppXt1. If one of FaxTx1, FaxTx2, and FaxTx3 selected on the setting screen of FIG. 24 is not implemented in the multifunction machine 101, installation and updating as shown in FIG. 13 are performed. The selecting operation on the setting screen of FIG. 24 may be performed as part of the updating operation on the operations screen described above with reference to FIG. 13.

FIG. 25 is a diagram for illustrating methods of obtaining modules for updating the bundle applications 147 and the bundle services 148.

In FIG. 25, arrow A indicates a method that obtains modules for updating from the memory card 235 inserted into the multifunction machine 101. The memory card 235 is, for example, an SD card or IC card. According to the method indicated by arrow A in FIG. 25, the SAS manager 511 updates the bundle applications 147 and the bundle services 148 implemented in the multifunction machine 101 with programs obtained from the memory card 235. According to this method, it is possible to perform updating even in an apparatus that is not connected to a network.

In FIG. 25, arrow B indicates a method that obtains modules for updating from a bundle server 901 by "pull"-type communication through a network 903. The main actor of the "pull"-type communication is the SAS 411 of the multifunction machine 101. According to the method indicated by arrow B in FIG. 25, the SAS manager 511 updates the bundle applications 147 and the bundle services 148 implemented in the multifunction machine 101 with programs obtained by the "pull"-type communication. According to this method, it is possible to perform updating without using an SD card or IC card.

In FIG. 25, arrow C indicates a method that obtains modules for updating from a bundle server 901 by "push"-type communication through the network 903. The main actor of the "push"-type communication is the bundle server 901. According to the method indicated by arrow C in FIG. 25, the SAS manager 511 updates the bundle applications 147 and the bundle services 148 implemented in the multifunction machine 101 with programs obtained by the "push"-type communication. According to this method, it is possible to perform updating under remote control from a server.

According to these updating methods, updating may be performed either automatically or manually. In FIGS. 13 and 21, updating is performed immediately after the updating operation is performed. Alternatively, updating may be periodically performed using an updating setting by the updating operation as a trigger.

The present invention is not limited to the specifically disclosed embodiment, and variations and modifications may be made without departing from the scope of the present invention.

The present application is based on Japanese Priority Patent Applications No. 2005-246226, filed on Aug. 26, 2005, and No. 2006-224521, filed on Aug. 21, 2006, the entire contents of which are hereby incorporated by reference.

What is claimed is:

1. An image forming apparatus executing a program including a plurality of modules, the image forming apparatus comprising:
    a printing part;
    an input part configured to receive an input of updating information of the program;
    a determination part configured to determine whether a module, of the plurality of modules, to be updated is active or not active; and
    a change part configured to update directly to a final updated state only the module to be updated which has been determined to be not active among the plurality of modules by the determining part, and change a relationship of connection of the modules in accordance with the updating information so as to update directly to the final state the module to be updated of the program while others of the plurality of modules of the image forming apparatus are operating and without changing the others of the plurality of modules,
    wherein the change part changes the relationship of connection of at least one of the modules corresponding to a part to be changed specified in the updating information.

2. The image forming apparatus as claimed in claim 1, wherein at least a time when the at least one of the modules corresponding to the part to be changed is not in operation is specified as the time for updating.

3. The image forming apparatus as claimed in claim 1, wherein:
    the time for updating is specified in the updating information by identifying at least one of the modules in operation; and
    when the at least one of the modules specified as the time for updating is in operation, the determination part determines that the operating state of the program corresponds to the time for updating.

4. The image forming apparatus as claimed in claim 1, wherein the change part waits to change the relationship of connection of the modules until the determination part determines that the operating state of the program corresponds to the time for updating.

5. The image forming apparatus as claimed in claim 1, wherein if addition of a new module is specified in the updating information, the change part generates the new module, and changes the relationship of connection of the modules including the new module.

6. The image forming apparatus as claimed in claim 1, wherein the modules of the program correspond to respective states in a state transition of the program.

7. The image forming apparatus as claimed in claim 1, wherein the change part is configured to change the relationship of the connection of the modules while the program is being operated.

8. The image forming apparatus as claimed in claim 1, wherein:
    the program is operating when the change part updates the module which has been determined to be not active among the plurality of modules by the determination part.

9. An information processing method executed by an image forming apparatus executing a program including a plurality of modules, the information processing method comprising:

receiving an input of updating information of the program;

determining whether a module, of the plurality of modules, to be updated is active or not active;

updating only the module to be updated which has been determined to be not active among the plurality of modules by the determining directly to a final updated state in accordance with the updating information which has been received, when the module to be updated is determined not be active while others of the plurality of modules are operating and without changing the others of the plurality of modules; and changing a relationship of connection of the modules in accordance with the updating information, while others of the plurality of modules are operating, wherein said changing changes the relationship of connection of at least one of the modules corresponding to a part to be changed specified in the updating information so that the at least one of the modules is updated directly to the final state.

10. The information processing method as claimed in claim 9, wherein at least a time when the at least one of the modules corresponding to the part to be changed is not in operation is specified as the time for updating.

11. The information processing method as claimed in claim 9, wherein:

the time for updating is specified in the updating information by identifying at least one of the modules in operation; and when the at least one of the modules specified as the time for updating is in operation, said determining determines that the operating state of the program corresponds to the time for updating.

12. The information processing method as claimed in claim 9, wherein said changing waits to change the relationship of connection of the modules until said determining determines that the operating state of the program corresponds to the time for updating.

13. The information processing method as claimed in claim 9, wherein if addition of a new module is specified in the updating information, said changing generates the new module, and changes the relationship of connection of the modules including the new module.

14. The information processing method as claimed in claim 9, wherein the modules of the program correspond to respective states in a state transition of the program.

15. A non-transitory computer-readable recording medium on which is recorded an information processing program for causing a computer to execute an information processing method as set forth in claim 9.

16. The information processing method as claimed in claim 9, wherein:

the program is operating during the updating of the module which has been determined to be not active among the plurality of modules.

* * * * *